United States Patent [19]

Ozaki et al.

[11] Patent Number: 4,841,489

[45] Date of Patent: Jun. 20, 1989

[54] METHOD OF IMAGING AN OBJECT BY ULTRASONIC OR ELECTROMAGNETIC WAVES

[75] Inventors: Yoshihiko Ozaki; Hiroaki Sumitani; Toshimasa Tomoda; Fumihide Sato; Kenji Kusano, all of Amagasaki, Japan

[73] Assignee: Mitsubishi Denki Kabushiki Kaisha, Tokyo, Japan

[21] Appl. No.: 946,481

[22] Filed: Dec. 24, 1986

[30] Foreign Application Priority Data

| Dec. 27, 1985 | [JP] | Japan | 60-292763 |
| Dec. 27, 1985 | [JP] | Japan | 60-292764 |
| Dec. 27, 1985 | [JP] | Japan | 60-292768 |
| Mar. 14, 1986 | [JP] | Japan | 61-57481 |
| Mar. 14, 1986 | [JP] | Japan | 61-57482 |
| Mar. 14, 1986 | [JP] | Japan | 61-57483 |

[51] Int. Cl.$^4$ .............................. G03B 42/06
[52] U.S. Cl. ........................ 367/7; 367/103; 367/104; 73/633
[58] Field of Search .......... 367/88, 7, 103, 105, 367/11, 104; 342/25; 73/627, 629, 633

[56] References Cited

U.S. PATENT DOCUMENTS 3,978,444 8/1976 Hitchcock ........................ 367/88
4,458,342 7/1984 Tournois ........................ 367/88

OTHER PUBLICATIONS

Gough, Side-Looking Sonar or Radar Using Phase Difference Monopulse Techniques Coherent and Non-coherent pplications, Aug. 1983, pp. 392–398.

Ishii et al., "Basic Study about the Ultrasonic Defect Dectecting the Synthetic Aperture", 1985, pp. 327–328.

"Review and Discussion of the Development of Synthetic Aperture Focusing Technique for Ultrasonic Testing".

Acoustic Holography, vol. 7, pp. 327–345, (1977), "Ultrasonic Synthetic Aperture Image", M. Dick, D. E. Dick, F. D. McLoad, N. B. Kindig, pp. 332–333.

Primary Examiner—Thomas H. Tarcza
Assistant Examiner—Daniel T. Pihulic
Attorney, Agent, or Firm—Oblon, Fisher, Spivak, McClelland & Maier

[57] ABSTRACT

A method of imaging an object by the ultrasonic or electromagnetic wave by mechanically or electronically scanning the ultrasonic or electromagnetic wave transmitting/receiving system to transmit the ultrasonic or electromagnetic wave beam spreading in space of the object and using the trace (TOF locus) from the transmission to the reception while receiving the reflected wave from the object, and sequentially reproducing the line image at the central line of the synthetic aperture range using the received signal group from the scanning points in the synthetic aperture range to sequentially image the area to be imaged while scanning the ultrasonic or electromagnetic wave transmitting/receiving system. An imaging apparatus applied with the method has a relatively simple hardware structure for reproducing the image and is also able to perform the operation in real time.

15 Claims, 19 Drawing Sheets

T ADDRESS (= K ADDRESS)

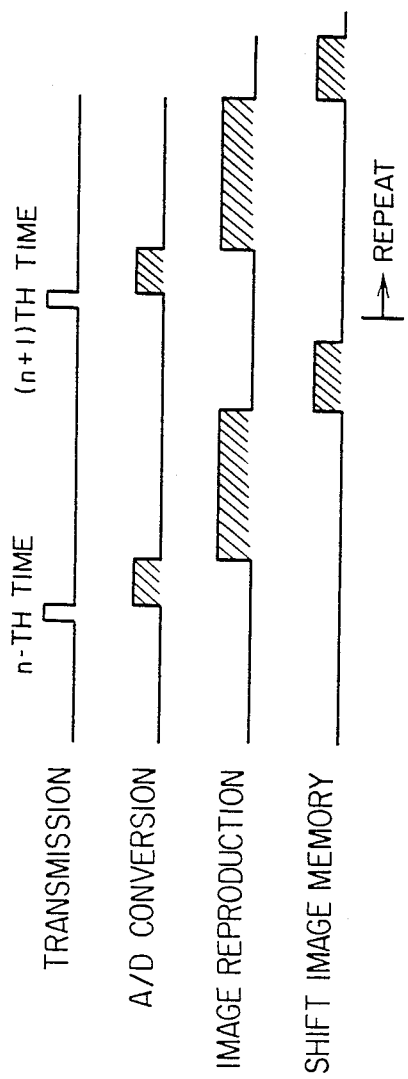

METHOD OF IMAGING AN OBJECT BY ULTRASONIC OR ELECTROMAGNETIC WAVES

BACKGROUND OF THE INVENTION

The present invention relates to a method of imaging an object or substance using an ultrasonic wave non-destructive inspection device which detects in the metal material, for example, to display the image of the defects in high resolution in real time, or a method of imaging an object by synthetic aperture radar capable of imaging ground surface conditions by remote operation in the air by the electromagnetic waves.

The manner employed for prior-art ultrasonic wave non-destructive inspection includes measuring the propagation time from the transmission to the reception of the reflected signal of the space information at some point of the object to be imaged by focusing the ultrasonic wave beam, electronically or mechanically scanning sequentially an ultrasonic transceiver element, and imaging and displaying the object to be imaged as a compilation of the point information.

A prior-art apparatus for this type of system is simple in itself, but the resolution or the azimuth resolution in the scanning direction, depends upon the focusing degree of the ultrasonic wave beam, that is, the azimuth resolution is provided by the spread of the beam itself, and the prior-art apparatus has a defect in that the azimuth resolution gets worse in proportion to the distance to the object since the spread of the beam is proportional to the distance to the object. Thus, particularly in recent times, this apparatus has not always sufficiently answered the requests for quantizing the shape of defects in the material so as to evaluate the healthy or remaining lifetime of the structural material for the piping welded portions of the recent atomic or thermal power plants.

Ultrasonic wave non-destructive inspection using a synthetic aperture method is intended to remove such disadvantages of the above mentioned pulse echo method, and it has features for improving the azimuth resolution and for obtaining a predetermined azimuth resolution irrespective of the distance to the object to be imaged. This will be described with reference to FIGS. 1 and 2. In FIG. 1, reference numeral 1 denotes an ultrasonic wave transceiver element having aperture d and capable of transmitting and receiving the ultrasonic wave, numeral 2 denotes an ultrasonic wave beam having a beam expanding angle $\theta\omega$ transmitted from the transceiver element 1, and numeral 3 denotes an object to be imaged, which is here taken to be a point object. Numeral 4 denotes a propagating medium interposed between the transceiver element 1 and the object 3, and numeral 5 denotes the scanning line (plane) of the transceiver element 1. Reference symbol f denotes the central frequency of the transmitted ultrasonic wave from the transceiver element 1, symbol C denotes the sonic velocity in the medium 4, and symbol L denotes the length of the scanning range of the transceiver 1 capable of observing the object 3 by the beam 2. In case the scanning direction of the transceiver element 1 is in the x-axis and the depthwise direction perpendicularly crossing the x-axis is in the z-axis, the object 3 is disposed at the point $(X_o, Z_o)$ in the x-z plane, the transceiver element scans on the scanning line 5 while transmitting and receiving the ultrasonic wave, and it is disposed at the point $(x, o)$. FIG. 2 shows the relationship between the reception signal of the transceiver element 1 resulting from the reflection from the object 3 to be imaged at each scanning point (transmitting point) in FIG. 1 and the time from the point of transmittal. Here, the time $t(x)$ from the transmission o the reception of the received ultrasonic wave signal of the transceiver element 1 at the scanning point $(x, o)$, i.e., the phase delay is given by the following equation (1).

$$t(x) = 2/c \sqrt{(x - X_o)^2 + Z_o^2} \tag{1}$$

The time of flight locus (hereinafter referred to as "TOF locus") given by the equation (1) forms the hyperbolic curve as shown in FIG. 2 by the broken line. The signal intensity resulting from the object reflection dispersed in time space on the hyperbolic curve in FIG. 2 is said to be compressable on the corresponding object point of the object 3 to be imaged by coherent addition (same phase) of the received signal within the range of length L. This is physically equivalent to the sequential occupation of the aperture of the ultrasonic transceiver element having an aperture of length L determined from the spreading angle $\theta\omega$ of the ultrasonic wave beam 2 by the scanning points on the scanning line 5 in FIG. 1, i.e., the emission of the object 3 to be imaged by the transceiver element having aperture L. This length L is called "synthetic aperture length", and the method of forming an image of the object 3 to be imaged in this manner is called "synthetic aperture method".

In this case, the azimuth resolution $\delta x$ becomes as follows in the following equation (2):

$$\delta x = (\lambda/L) Z_o \tag{2}$$

where $\lambda$ represents the ultrasonic wave wavelength. Symbol L is given by the spread $\lambda/d$ of the ultrasonic wave beam, and the distance $Z_o$ to the object 3 to be imaged as represented by the following equation (3).

$$L = (\lambda/d) Z_o \tag{3}$$

The L determined by the equation (3) is substituted for the equation (2), and the azimuth resolution is eventually represented as the following equation (4).

$$\delta x = d \tag{4}$$

The azimuth resolution by the synthetic aperture method does not depend upon the distance $Z_o$ to the object 3 to be imaged as identified from the equation (4) but it becomes constant in the degree of the aperture d of the transceiver element 1.

The execution of the object imaging method by the synthetic aperture method, for example, with respect to the x-z plane in FIG. 1 will be described with reference to FIG. 3. In FIG. 3, the area reproduced by the received signal group at all the scanning points of the range of the synthetic aperture length L includes respective points on the line segment l to be imaged of the central line of the synthetic aperture length L, and the received signal necessary to reproduce the point $l_k$ to be imaged on the line segment l to be imaged includes the value of the received signal on the hyperbolic curve designated by the dotted chain line in FIG. 3. The synthetic aperture length L at this time is defined corresponding to the position of the longest distance in the z-axis direction to be imaged in the x-z plane. The range of the definition of the hyperbolic curve is determined by the spread of the ultrasonic wave beam of the transceiver, being denoted by the broken line in FIG. 3. In other words, in order to image the area of the length of the synthetic aperture length L in the scanning direction, the received signal group including all the scanning points in the scanning range of 2L being twice the synthetic aperture length becomes necessary. In FIG. 3, the received signal group necessary to image the area AR1 to be imaged of the width L in the x-axis direction necessitates all the received signal group in the scanning range SC1 of the length 2L, and the received signal group necessary to image the area AR2 to be imaged of the width L similarly necessitates all the received signal group in the scanning range SC2 of the length 2L.

In case of imaging the area to be imaged in the wide range according to this type method, it is necessary to once A/D-convert the received signal train at the respective scanning points, store them into a memory, input the received signal train at every scanning point into a two-dimensional memory being formed to be the two-dimensional configuration corresponding to the scanning point in one direction and to the time, namely to the distance in the z-axis direction, sequentially pick up the signal value of the received signal train at the respective scanning points determined by the TOF locus line corresponding to the points to be imaged, and add them, since the TOF locus line denoted by the hyperbolic curve for reproducing the image has a different function form from that of the points to be reproduced having the different value with respect to the z-axis direction (the direction perpendicular to the scanning direction). This processing operation is repeatedly executed for all the points to be imaged.

Since the prior-art method of imaging an object by ultrasonic or electromagnetic waves is constructed as described above, the area to be imaged is sequentially updated, and the method requires a large capacity memory for storing the voluminous received signal group and extremely long image reproducing time unless considerably effort is put into devising storage for the received signal train of scanning points and for processing the image reproduction, in the case of non-destructive inspection of a pipe etc. wherein sequential updating of the area to be imaged and imaging of a wide range area must be performed. Further, the reproduced image results in a drawback of attenuation due to the space propagation characteristic of ultrasonic or electromagnetic waves, i.e., beam spreading and propagation distance, and if no correction is executed, the physical information such as the scattering coefficient of the object cannot be suitably obtained.

SUMMARY OF THE INVENTION

The present invention has been made to eliminate the above mentioned drawbacks and has for its object to provide a method of imaging an object by ultrasonic or electromagnetic waves based on a synthetic aperture method capable of economizing memory capacity, speeding up (achieving a real time base) image reproduction and obtaining a high quality image.

The present invention provides, as a first aspect, a method of imaging an object by the ultrasonic or electromagnetic waves based on a synthetic aperture method for obtaining an image of the object by receiving the reflected wave of the ultrasonic or electromagnetic wave beam from the object and using the TOF locus line along the scanning direction determined by the phase delay from the transmission to the reception of the received signal, comprising the steps of: line-shifting the data in a waveform memory by every one scanning portion when sequentially storing the discrete digital value being analog/digital converted from the received signal train at each scanning point into the waveform memory for the received signal group in only one synthetic aperture range; normally storing into the waveform memory the received signal group in only one synthetic aperture range, where the latest scanning point is used as the end point thereof; reading out each data group in the waveform memory by means of the address information group corresponding to each TOF locus line; accumulating the data at each data group to obtain the data for the line image of the central line in the synthetic aperture range where the latest scanning point is used as the end point thereof; multiplying the data for the line image by the image correcting value determined by the distance directly below the scanning line (plane) of the ultrasonic or electromagnetic wave transmission/reception system; and sequentially imaging the corrected data for the line image.

The present invention provides, as a second aspect, a method of imaging an object by ultrasonic or electromagnetic waves based on a synthetic aperture method for obtaining the data of an image of the object to be imaged by emitting an ultrasonic or electromagnetic wave beam spreading spatially to the object to be imaged while mechanically or electronically scanning the ultrasonic wave or electromagnetic wave transmission/reception system when imaging the image of the object to be imaged by ultrasonic or electromagnetic waves, receiving the reflected wave from the object, sequentially distributing the received signal intensity uniformly to the equidistant line area defined in the spread range of the ultrasonic or electromagnetic wave beam on the circular-arc having a radius taken as the distance determined by the signal propagation time from the transmission to the reception of the received signal and the velocity of sound or light and a center taken as the scanning point position for each scanning point, and sequentially adding the received signal value distributed at the same position in space, comprising the steps of: scanning the ultrasonic wave or electromagnetic wave transmission/reception system; uniformly distributing the discrete digital value being analog/digital converted from the received signal train at the scanning point in accordance with the equidistant line predetermined and tabled in an image memory consisting of a two-dimensional frame memory configuration corresponding to the scanning point in only one synthetic aperture range; preliminarily line-shifting by one scanning point all the data up to the immediately previous point that is currently stored in the image memory when adding and storing the value of the same address in the image memory; uniformly distributing, adding and storing the received signal train corresponding to the latest scanning point into the image memory; obtaining the data for a line image of the central line in the synthetic aperture range of the object to be imaged; multiplying the data for the line image by the corrected imaging value determined by the distance directly below the scanning line or plane of the ultrasonic or electromagnetic wave transmission/reception system to correct the data for the line image; imaging and indicating the corrected data for the line image as a line image of the central line in the synthetic aperture range; and sequentially imaging and indicating the data for the line image sequentially obtained at each scanning line thereby imaging the space area to be imaged by means of scanning the ultrasonic or electromagnetic wave transmission/reception system.

The method of imaging an object by ultrasonic or electromagnetic waves according to the first aspect of the present invention, line-shifts by one scanning point the received signal group being currently stored up to the scanning point immediately before the latest scanning point when storing the discrete digital value that is analog/digital converted from the received signal train at each scanning point in the waveform memory; stores the received signal group obtained from one synthetic aperture range having the latest scanning point as the end point into the waveform memory in the matrix form by means of storing the received signal train corresponding to the latest scanning point into the area in which the received signal train corresponding to the just previous scanning point was stored; reads out each data group in the wave memory by means of each address information group corresponding to each TOF locus line; accumulates for every data group data for obtaining a line image corresponding to the central line in the synthetic aperture range; multiplies the data for the line image by the image correcting value determined by the distance directly below the scanning line (plane) of the ultrasonic or electromagnetic wave transmission/reception system to obtain corrected data; and sequentially images the corrected line image data for every transmitted and received waves of the ultrasonic or electromagnetic wave at each scanning point.

The method of imaging an object by ultrasonic or electromagnetic waves as a second aspect, uniformly distributes the received signal on the equidistant line determined by the time from the transmission of the received signal to the reception thereof and the sonic velocity (or light velocity); reproduces the line image of the object at the time point when the system has completed scanning in the synthetic aperture range; sequentially reproduces the line image of the central line in the synthetic aperture range by means of sequentially shifting the synthetic aperture range by one scanning portion; and preliminarily calculates the equidistant line group corresponding to a sampling number of the received signal train corresponding to one scanning point to make a table of equidistant lines when uniformly distributing the received signal on the equidistant line so that the received signal is distributed uniformly by referring to the equidistant line table. This equidistant line table is shared when distributing the received signal train uniformly at all scanning points, and after the correcting of the reproduced image intensity depending upon the ultrasonic (or electromagnetic) wave propagating distance, the ultrasonic (or electromagnetic) wave beam spread and the like is performed by means of correcting the ultrasonic (or electromagnetic) wave propagation characteristics, the reproduced image may be obtained with high quality that does not depend on the distance to the object to be imaged.

BRIEF DESCRIPTION OF THE DRAWINGS

FIG. 25 is a time chart view showing the operating sequence of the apparatus above.

DESCRIPTION OF THE PREFERRED EMBODIMENTS

Now, embodiments of the present invention will be described with reference to the accompanying drawings.

Figure 1:
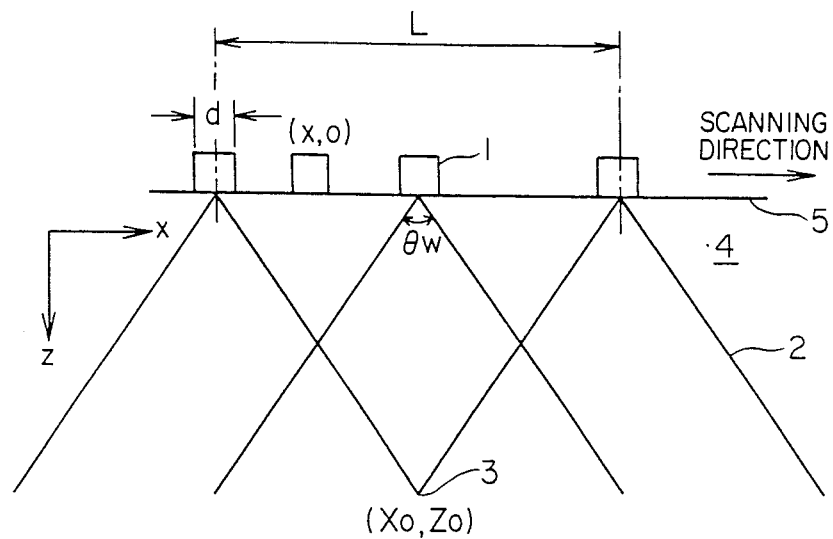
FIG. 1 is a view for explaining a prior-art image reproducing method of an object according to a synthetic aperture method.
Figure 2:
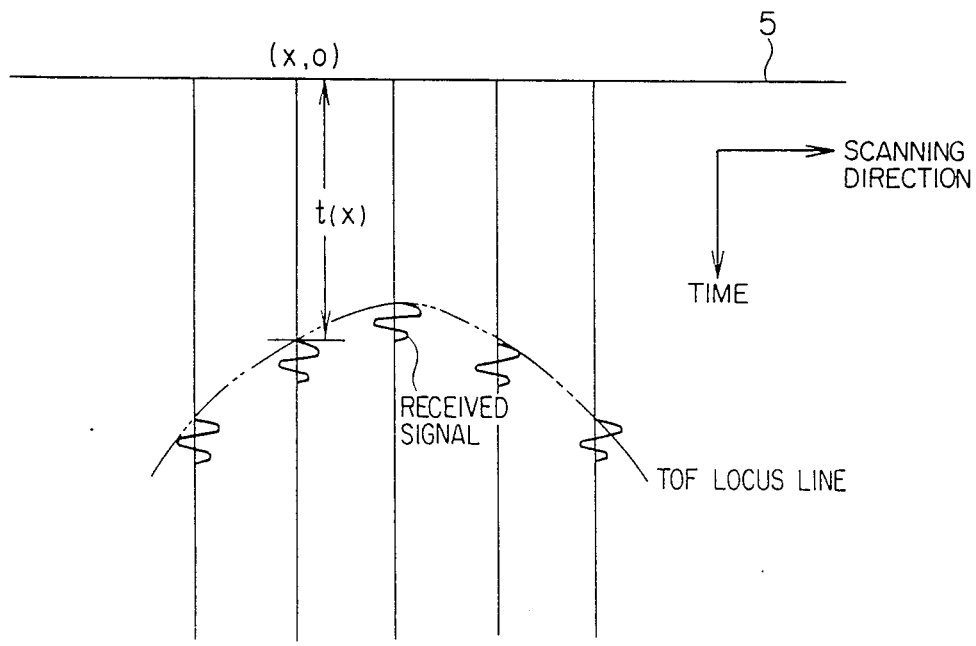
FIG. 2 is a view showing a TOF locus from the transmission to the reception of a received signal when an ultrasonic transceiver element receives the ultrasonic signal reflected by an object to be imaged along a scanning line (plane)
Figure 3:
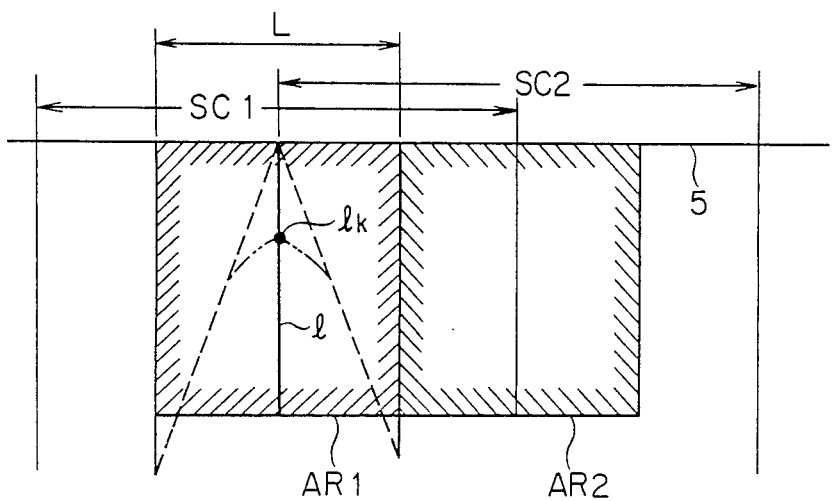
FIG. 3 is a view for explaining the necessary scanning range of an area to be imaged (an object line to be imaged), a received ultrasonic wave signal group necessary to reproduce an image and a necessary scanning range of an ultrasonic transceiver element necessary to obtain received signal group in case of imaging an object according to a synthetic aperture method.

An embodiment of the present invention will be first described in principle so as to readily understand the embodiment of the present invention. TOF locus lines corresponding to respective picture elements for outputting data of the respective picture elements forming a line image of line segments 1 to be imaged for imaging the line segments 1 to be imaged of a central line in one synthetic aperture range are different from each other. However, the function format of the TOF locus lines in one synthetic aperture range is the same as that corresponding to the function format of the TOF locus lines in another one synthetic aperture range. In other words, by noticing that each TOF locus line corresponding to each received signal group in each synthetic aperture range for reproducing the image of each line segment to be imaged in the direction directly under the scanning line (e.g., direction z in FIG. 1) can be commonly used for each received signal group in each synthetic aperture range corresponding to the line segment to be imaged to be reproduced even if the synthetic aperture range is disposed at a different position, the common TOF locus line is utilized for processing the image data. The synthetic aperture range in this specification is defined as that corresponding to the position separated the farthest from the scanning point to be imaged and reproduced. This will be described with reference to FIG. 4.

Figure 4:
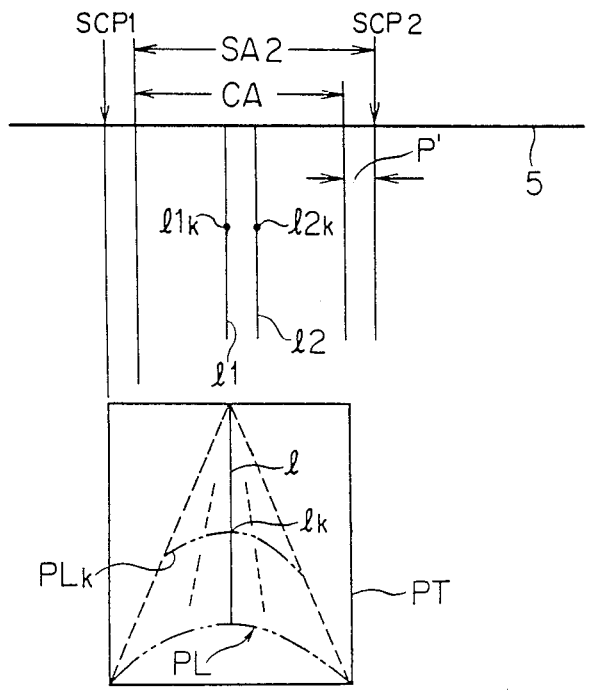
FIG. 4 is a view for fundamentally explaining a method of imaging an object according to the present invention.

In FIG. 4, when a line segment 11 to be imaged of the central line of a synthetic aperture range SA1 is imaged and reproduced, a point to be imaged on the line segment 11 can be sequentially reproduced by means of address information of the TOF locus line PL of a TOF locus line table PT shown in FIG. 4 for the received signal group of the synthetic aperture range SA1. For example, address information group with respect to the hyperbolic TOF locus line PL the peak point thereof being the point to be imaged of the line segment 1 is stored in the TOF locus line table PT. It is assumed that a line segment to be imaged for the aperture range SA1 is represented by 11, and one line segment to be imaged on the line segment 11 is represented by $11_k$. When the point to be imaged on the line segment corresponding to $11_k$ is represented by $1_k$ and the TOF locus line corresponding to the point $1_k$ is represented by $PL_k$, address information with respect to the TOF locus line $PL_k$ is produced from the table PT, the address information, namely, the received signal on the TOF locus line $PL_k$ in the received signal group in the range SA1 is produced from a waveform memory to be described later, and it is added to produce data before the correction of one picture element corresponding to the point $11_k$ to be imaged. If this sequence is conducted for all the points to be imaged of the line segments 11, data before the correction of one line for line image for imaging the line segment 11 is obtained. Then, when imaging a line segment 12 corresponding to a synthetic aperture range SA2 displaced by one scanning P' from the synthetic aperture range SA1, the received signal group of a common range CA in case of the aperture ranges SA1 and SA2 are used commonly when calculating data for line image of the line segment 12. Therefore, the received signal group for the range CA is made to remain even after calculating the data for the line image before correcting the line segment 11. The received signal train obtained by the scanning of a scanning point SCP2 is added to such a received signal group, and the received signal group for the range SA2 is similarly calculated in the case of the range SA1 to obtain data for a line image before the correction for the line segment 12. If the point $12_k$ to be imaged on the line segment 12 corresponds to the point $1_k$ on the line segment 1, address information with respect to the same TOF locus line $PL_k$ at the point $11_k$ can be commonly used. Thus, the address information with respect to the TOF locus line PL stored in the table PT can be commonly used to obtain data for each line image for the received signal group of each synthetic aperture range. When the above-described processing operation is sequentially repeated to correct the data for the line image at every instance as will be described, a two-dimensional image is sequentially produced as an assembly of line images. At this time, for example, in the case of the synthetic aperture ranges SA1 and SA2, it is noted that the received signal trains in the common range CA are entirely the same except that the left end scanning point SCP1 in the synthetic aperture range SA1 is different from the right end scanning point SCP2 in the synthetic aperture range SA2. In other words, when a two-dimensional memory (hereinafter referred to as "waveform memory") for merely storing the received signal group in only one synthetic aperture range is provided and an ultrasonic transceiver element is sequentially scanned, an ultrasonic wave is transmitted and received, a received signal is analog/digital converted (hereinafter referred to as "A/D converted"), and then stored into the waveform memory, all the received signal groups in the waveform memory are line-shifted by one scan, and the received signal train is stored, after line-shifting, into the column for storing, where the received signal train corresponding to the scanning point immediately before the latest scanning point to be stored at present was stored before line-shifting. Then, it will be understood that the processing operation of reproducing the data of the line image by the table PT, outputting and displaying the data, and then shifting to the next scanning point may be sequentially repeated. Further, the point to be imaged of the line image of the line segment 1 is corrected by the ultrasonic wave propagating characteristic before outputting and displaying the line image to output and display the reproduced image from which influences of the ultrasonic wave propagation distance and the ultrasonic wave beam spreading are removed. At this time, the reproduced image can be corrected by multiplying the data of the line image of the point to be imaged on the line image by the correction value for the point, and if the correction value for the point to be imaged on the line image is tabled, the correction value can be shared for all the line images. In case the received signal groups are processed, it was described that the received signal group corresponding to one synthetic aperture range is stored into the waveform memory. However, the waveform memory may have a capacity larger than that.

Figure 5:
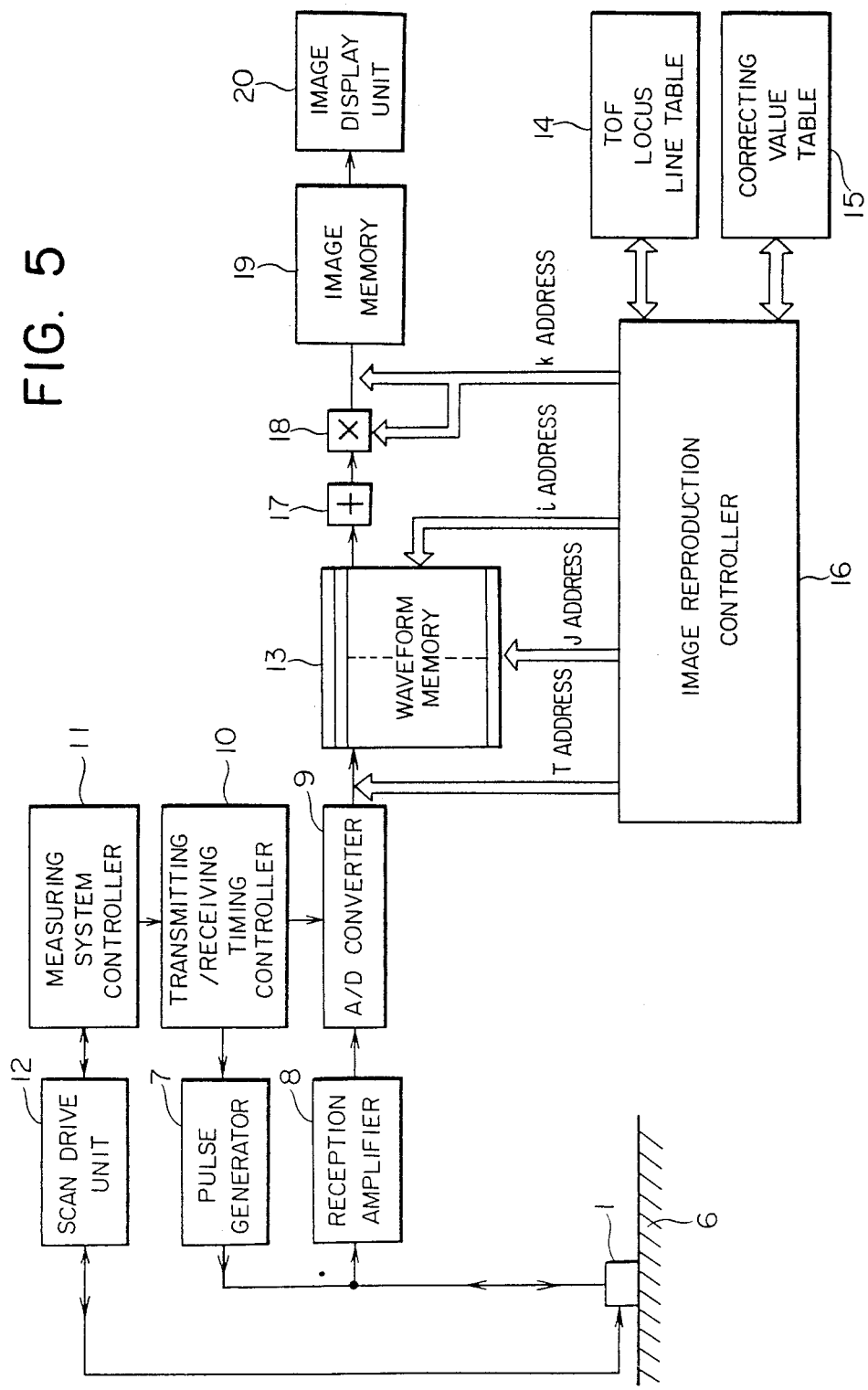
FIG. 5 is a functional block diagram for explaining in detail an embodiment of a method of imaging an object according to the present invention.

FIG. 5 is a block diagram of an apparatus applying an embodiment of the method of the present invention. In FIG. 5, reference numeral 1 denotes an ultrasonic wave transceiver element having aperture d and capable of transmitting an ultrasonic wave beam having the spreading of angle $\theta\omega$ and receiving an echo of the beam, numeral 6 denotes an object or substance, and the interior of the object 6 is inspected by the transceiver element 1 to make an image of the internal defect. Numeral 7 denotes a pulse generator for applying a spike-shaped pulse voltage to the element 1 to transmit an ultrasonic wave signal to the object 6, numeral 8 denotes a reception amplifier for amplifying the received ultrasonic wave signal obtained by the element 1, and numeral 9 denotes an A/D converter for A/D converting the received signal amplified to a predetermined level by the amplifier 8 to produce a digital value to form continuous signals into discrete signals with a predetermined sampling time. Numeral 10 denotes a transmitting/receiving timing controller to generate timing signals for applying pulse voltage to the element 1 by the generator 7 and to generate timing signals for controlling the starting time for the A/D converter 9 to A/D convert the received signal. Numeral 11 denotes a measuring system controller for providing control signals for generating a timing signal to the controller 10, for generating a control signal for scanning the element 1 on the surface of the object 6 and for controlling the timing for inputting position information at the time when the element 1 transmits and receives the ultrasonic wave through the scan drive unit encoder of the element 1, and numeral 12 denotes a scan drive unit for scanning the element 1 by the scan control signal from the controller 11. Numeral 13 denotes a waveform memory for storing the received signal train at the scanning point converted by the A/D converter 9 to a discrete digital value while sequentially line-shifting the entire area data, and numeral 14 denotes a TOF locus line table for imaging and reproducing points on the line to be imaged from the received signal group in the above mentioned synthetic aperture range, and it also denotes an address table into which an address information group is written for reading out the corresponding value in the received signal train corresponding to the scanning point from the memory 13 according to the TOF locus line necessary to image and reproduce the point to be imaged on the line 1 to be imaged as will be described. Numeral 15 denotes a correcting value table for correcting the reproduced image corresponding to the point on the line to be imaged, and the correcting value is obtained to be stored by calculating in advance only the z-axis value in FIG. 7 of the point to be imaged as will be described. Numeral 16 denotes an image reproduction controller for controlling the generation of the T address for writing the discrete digital value obtained by the A/D converter 9 into the memory 13, the (i, J) address for reading out the value from the waveform memory 13 according to address information in the TOF locus table 14, the k address which is the information regarding which number of the point to be imaged on a line 1 to be imaged corresponds to the added or accumulated result of a value read out by means of sequentially or parallely reading out the value in the memory 13 along the TOF locus line, and the signal for reading out the correcting value from the table 15 synchronously with the k address above for correcting the image for the added result as the reproduced image value. Numeral 17 denotes an accumulator for adding or accumulating the value read out of the memory 13 according to the (i, J) address signal from the controller 16, and numeral 18 denotes a multiplier for multiplying the correcting value for correcting the reproduced image read out of the table 15 according to the k address signal as the information to be imaged from the controller 16 by the accumulated result as the output of the accumulator 17. Numeral 19 denotes an image memory for sequentially writing the correcting image to be reproduced as the output of the multiplier 18 according to the k address from the controller 16 and storing the reproduced image of the line to be imaged, and numeral 20 denotes an image display unit for displaying the reproduced image value in the memory 19 while sequentially line-shifting (scrolling) to display continuously the area of the plane image in an updated manner.

Figure 6:
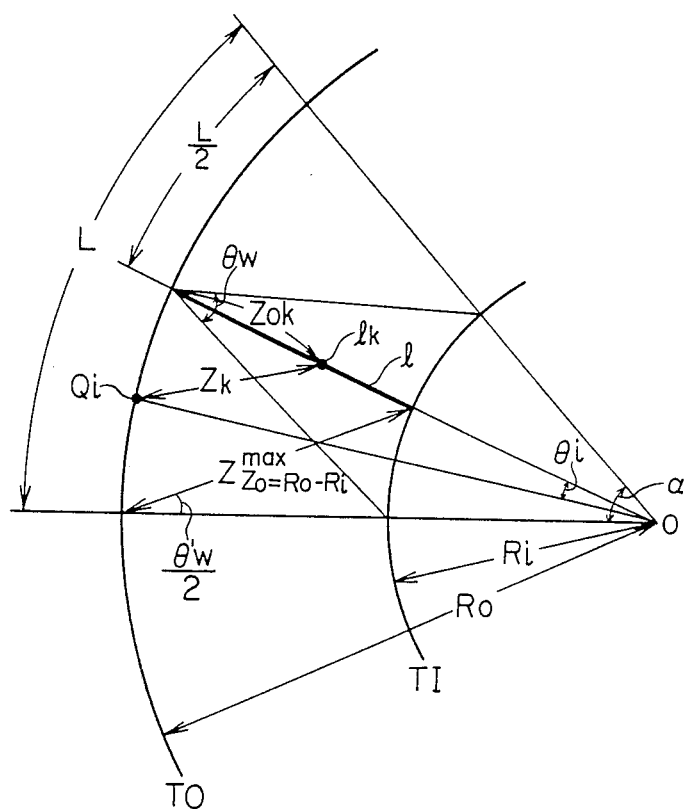
FIG. 6 is a view for explaining a waveform memory and a TOF locus table shown in FIG. 5.
Figure 7:
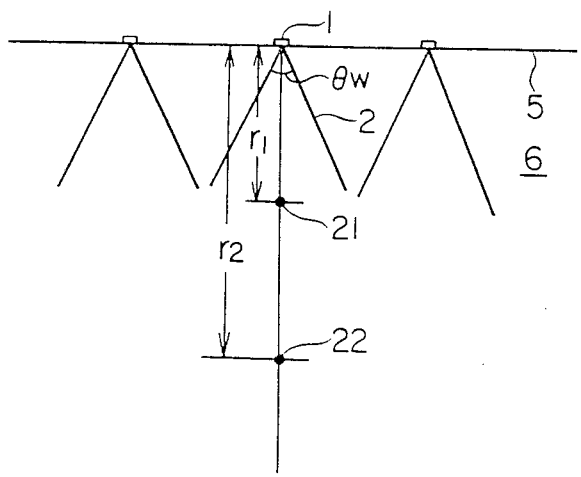
FIG. 7 is an explanatory view for explaining a corrected value table in FIG. 5.
Figure 8:
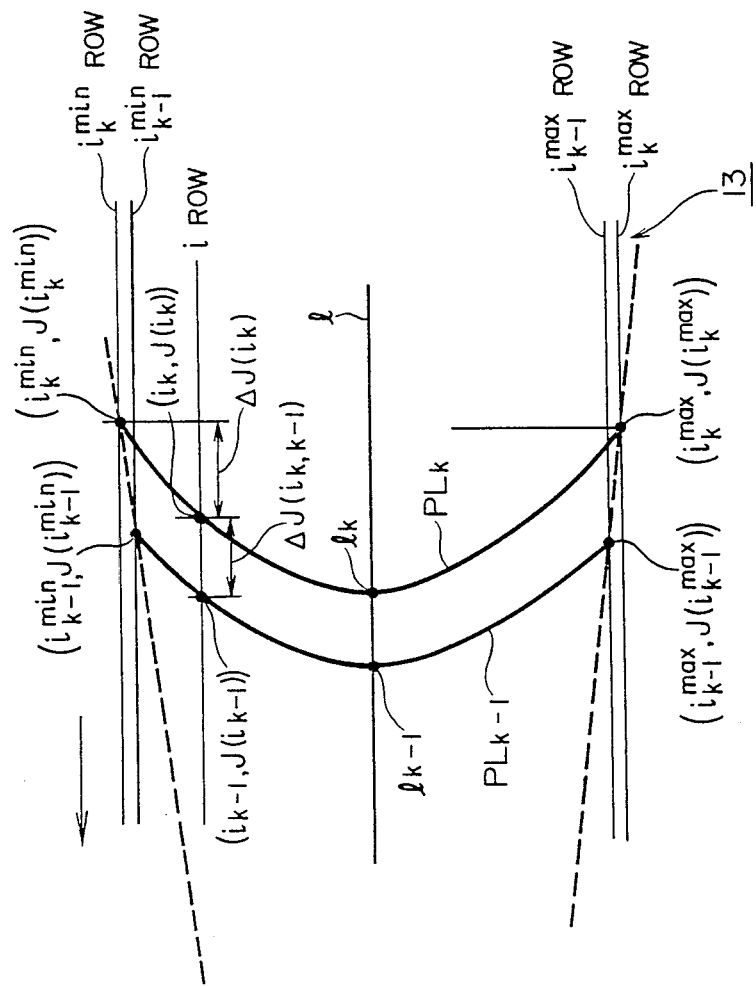
FIG. 8 is a view for explaining the relationship between a TOF locus line table and a waveform memory in FIG. 5 for a method of imaging an object according to another embodiment of the present invention.

FIGS. 6 to 8 show the construction of the waveform memory 13, the TOF locus line table 14 and the correcting value table 15 shown in FIG. 5 when the object 6 is of a circular tubular shape.

The construction of the waveform memory 13 and the TOF locus line table 14 shown in FIG. 5 will be described in regards to a case where the object 6 to be inspected is of a circular tubular shape with reference to FIG. 6. In FIG. 6, the outer radius of a conduit from the center 0 of the conduit to the outer wall TO of the conduit is represented by Ro, the inner radius of the conduit from the center 0 of the conduit to the inner wall TI of the conduit is represented by Ri, and it is assumed that the ultrasonic transceiver element 1 shown in FIG. 5 scans the outer wall TO of the conduit circumferentially. When the aperture of the element 1 is d, the sonic velocity in the material of the conduit is c, the central frequency of the transmitted ultrasonic wave is f, the synthetic aperture length on the outer wall TO of the conduit for observing one point on the inner wall TI of the conduit by the ultrasonic wave beam is L, the angle at the center O of the conduit for observing the length L is $\alpha$, and the spreading angle of the beam of the element 1 is $\theta\omega$, the wavelength $\lambda$ of the ultrasonic wave is represented as follows:

$$\lambda = c/f \qquad (5)$$

and the spreading angle $\theta\omega$ of the ultrasonic wave beam is represented by the following formula (6):

$$\theta\omega = \lambda/d \qquad (6)$$

The synthetic aperture length L is represented by the following equation (7) with the angle $\alpha$:

$$L = Ro \cdot \alpha \qquad (7)$$

At this time, the angle 60 is given by the following equation (8)

$$\alpha = 2\cos^{-1}\left(\frac{Ro^2 + Ri^2 - \left(Ro\cos\frac{\theta\omega}{2} - \sqrt{Ri^2 - Ro^2\sin^2\frac{\theta\omega}{2}}\right)^2}{2Ro \cdot Ri}\right) \qquad (8)$$

Then, the scanning point Q (e.g., Qi) on the outer wall of the conduit corresponding to the central angle $\theta$ (e.g., $\theta_i$) from the line segment 1 to be imaged is considered. In the drawing, when the position of the depth Zo on the line segment 1 to be imaged (when the variable K is specified as one value, $Zo_k$ is one value of Zo up to the point $1_k$ to be imaged), the distance for observing the position from the scanning point Q (e.g., Qi) is Z (in case that variable k is specified to one value, $Z_k$ is one value of Z when the scanning point is Qi and the point to be imaged is $1_k$), it is given by the following equation (9):

$$Z = \sqrt{Ro^2 + (Ro - Zo)^2 - 2Ro(Ro - Zo)\cos\theta} \quad (9)$$

The angle $\theta_{zo}^{max}$ of the scanning point disposed at the farthest position to be observed at the point of distance Zo by the ultrasonic wave beam with respect to the line segment l to be imaged as a reference line at the central point O of the conduit is limited by the spreading angle $\theta\omega$ of the ultrasonic wave, and given by the following equation (10):

$$\theta_{Zo}^{max} = \cos^{-1}\left(\frac{Ro^2 + (Ro - Zo)^2 - \left(Ro\cos\frac{\theta\omega}{2} - \sqrt{(Ro - Zo)^2 - Ro^2\sin^2\frac{\theta\omega}{2}}\right)^2}{2Ro(Ro - Zo)}\right) \quad (10)$$

Therefore, the range of the angle $\theta_{Zo}$ of the scanning point of the ultrasonic wave beam for observing the point of depth Zo at the center O of the conduit is given by the following formula (11) by taking the line segment l to be imaged as the reference line:

$$|\theta_{Zo}| \leqq \theta_{Zo}^{max} \quad (11)$$

If the ultrasonic wave signal propagated at a distance $Z_{Zo=Ro-Ri}^{max}$ between the scanning point for observing the point on the inner wall TI of the conduit by the ultrasonic wave beam on the line segment l to be imaged, i.e., the scanning point of both ends on the outer wall TO of the conduit of the synthetic aperture length L shown by L in the drawing and the point on the inner wall TI of the conduit is not included to be used as the received signal train, all the points of the line segment l to be imaged in the drawing are neither imaged nor reproduced. $Z_{Zo=Ro-Ri}^{max}$ is given by the following equation (12):

$$Z_{Zo-Ri}^{max} = Ro \cdot \cos(\theta\omega/2) - \sqrt{Ri^2 - Ro^2\sin^2(\theta\omega/2)} \quad (12)$$

Therefore, regarding the capacity (M×N frame memory configuration) of the waveform memory 13 in FIG. 5, the number M of rows is given with $\Delta\theta$ corresponding to the angular pitch at the center 0 of the conduit at the scanning pitch of the element 1 by the following equation (13):

$$M = [L/(Ro \cdot \Delta\theta)]_{Gauss\ symbol} + 1 \quad (13)$$

And also, the number N of columns is given by the following equation (14) with the sampling time $\Delta t_R$ in case that the received ultrasonic wave signal is A/D converted:

$$N = [2 \cdot Z_{Zo=Ro-Ri}^{max}/(C \cdot \Delta t_R) + 0.5]_{Gauss\ symbol} + 1 \quad (14)$$

where [ ] Gauss Symbol represents an operator for converting the numerical value in [ ] to an integer number. Now, when the K-th point $l_k$ to be imaged of depth Zok on the line segment l to be imaged is imaged and reproduced, the value of the (i, J) address is read out from the received ultrasonic wave signal group in the memory 13 in FIG. 5 and added as below to obtain K-th reproduced imaged value before correction. Here, it is sufficient to describe that J address corresponding to the received i-th row signal train in the memory 13 in FIG. 5 can be obtained by means of this method. The depth Zok of the K-the point $l_k$ to be imaged on the line segment l is given by the following equation (15):

$$Zok = \tfrac{1}{2}(K - 1)C \cdot \Delta t_R \quad (15)$$

And the angle $\theta i$ in FIG. 6 being formed with the line segment l to be imaged of the scanning point Qi corresponding to the i-th row received signal train is represented by the following equation (16) with the number M of the rows determined by the equation (13) of the memory 13 in FIG. 5:

$$\theta i = \left(\frac{M + 1}{2} - i\right)\Delta\theta \quad (16)$$

The distance between the scanning point Qi and the point $l_k$ to be imaged is given by the following equation (17) with Zok, Oi of the equations (15) and (16):

$$Zk = \sqrt{Ro^2 + (Ro - Zok)^2 - 2Ro(Ro - Zok)\cos\theta i} \quad (17)$$

The value of the column address J to be read out from the i-th row received signal train in the memory 13 for the distance $z_k$ is given by the following equation (18):

$$J = [2 \cdot Zk/(C \cdot \Delta t_R) + 0.5]_{Gauss\ symbol} + 1 \quad (18)$$

where, the range of the scanning point Qi to be defined in the memory 13 for the point $l_k$ to be imaged, i.e., the range of the row address i is determined to take such values as $i_k^{min}$ to $i_k^{max}$ by the following equations (19) and (20) from the equations (10), (11), (15), (16).

$$\begin{cases} i_k^{min} = \left(\frac{M+1}{2} - \frac{1}{\Delta\theta}\cos^{-1}\left\{\frac{Ro^2 + (Ro - Zok)^2 - \left(Ro \cdot \cos\frac{\theta\omega}{2} - \sqrt{(Ro - Zok)^2 - Ro^2\sin^2\frac{\theta\omega}{2}}\right)^2}{2Ro \cdot (Ro - Zok)}\right\}\right)_{Gauss\ symbol} \quad (19) \\ i_k^{max} = (M + 1) - i_k^{min} \quad (20) \end{cases}$$

At this time, the maximum value $k^{max}$ of the K address showing the sequence of the point $l_k$ to be imaged is given by the following equation (21):

$$K^{max} = [2 \cdot (Ro - Ri)/(C \cdot \Delta t_R)]_{Gauss\ symbol} + 1 \quad (21)$$

Figure 11:
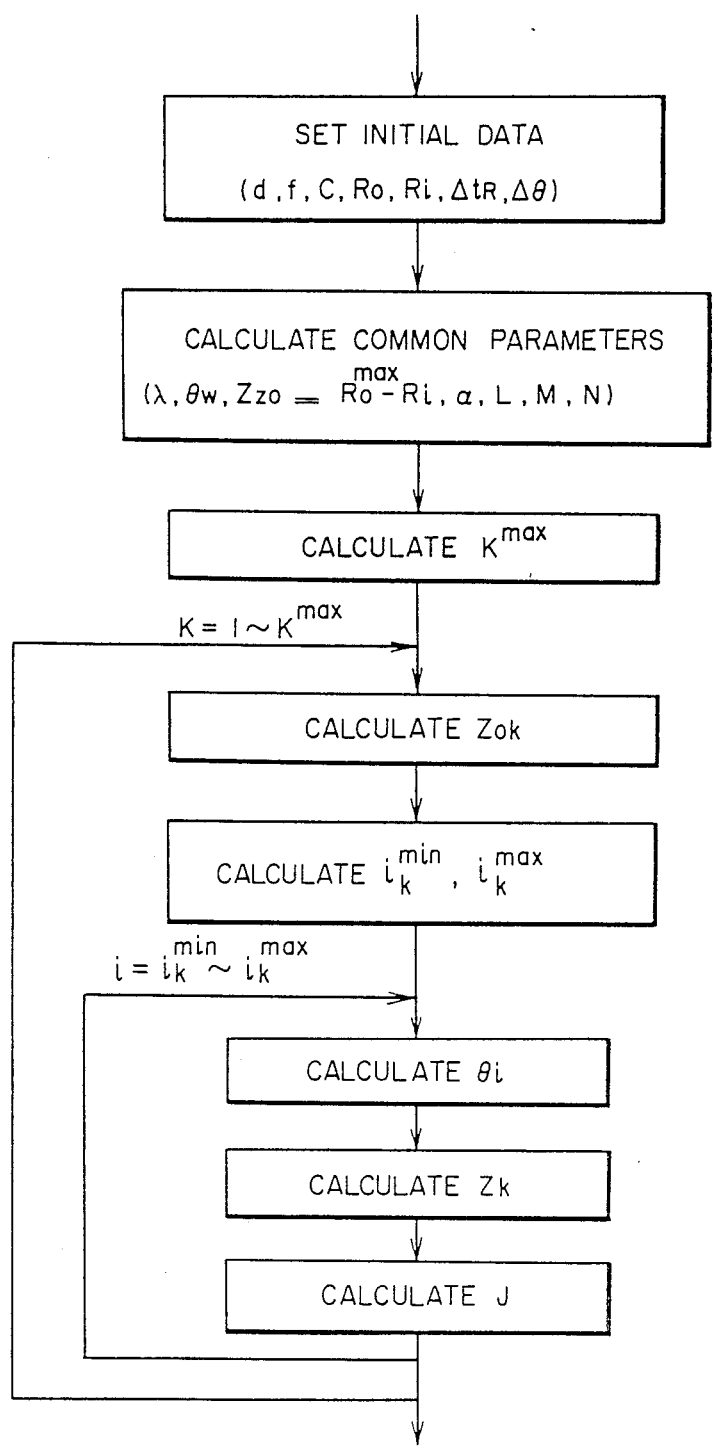
FIG. 11 is a calculating flow chart for concretely obtaining a TOF locus line table.

The combination of (K, i, J) determined by the above method is calculated in advance, and the result may be written and stored as the address table into the TOF locus line table 14 shown in FIG. 5. FIG. 11 concretely shows the manner of obtaining the combination of K, i and J address as the processing flow determined by the above mentioned method. The combination of the (K, i, J) may be calculated in advance according to the processing flow shown in FIG. 11, and the result may be written and stored as the address table into the TOF locus line table 14A in FIG. 5.

In FIG. 6, when the ultrasonic transceiver element 1 in FIG. 5 circumferentially scans the outer wall TO of the conduit and the received signal group obtained by scanning one synthetic aperture length shown by L in the drawing is processed as the image signal as described later, the data for the line image of the line segment 1 before correction in the drawing is obtained, the scanning point of the element 1 and the synthetic aperture range are shifted circumferentially by one scanning pitch, the line segment 1 to be imaged is also shifted circumferentially by one scanning pitch from the position as shown at each transmission and reception of the ultrasonic wave by each scanning point movement, and the data for the line image before correction is similarly obtained for the line segment to be imaged.

Next, the data for the line image before correction corresponding to the line segment 1 to be imaged obtained by the above method as the output of the accumulator 17 in FIG. 5 will be described with reference to FIG. 7 regarding the ultrasonic wave propagating characteristics, mainly the correction value table 15 for correcting by the ultrasonic beam spreading and distance. FIG. 7 shows the state where the ultrasonic wave beam 2 having space spreading is transmitted from the transceiver element 1 and the reflected wave from the point in the object 6 to be inspected is received by the element 1. In FIG. 7, it is assumed that the distances to the scanning line (plane) 5 of the points 21 and 22 are respectively $r_1$ and $r_2$, that their reflecting characteristics are the same, that ultrasonic wave incident angle dependence is not found, and that the ultrasonic wave reflection is isotropically conducted. When the ultrasonic wave beam transmitted from the ultrasonic transceiver element is propagated on a spherical surface, the sound pressure Pr at the distance r (not shown) from the scanning line (plane) 5 is given by the following equation (22) when the reference sound pressure (sound pressure at the distance $r_s$ (not shown)) is represented by Ps.

$$Pr = (r_s/r)Ps \quad (22)$$

If the ultrasonic wave beam is focused in a direction perpendicular to the paper surface in the drawing, i.e., perpendicular to the scanning direction along the scanning line 5, the sound pressure Pr at the distance r is similarly represented by following equation (23):

$$Pr = (r_s/r)^{\frac{1}{2}} Ps \quad (23)$$

Since the said sound pressure is incident at the point in the distance r, being isotropically reflected and received by the transceiver element 1, and being propagated along the spherical surface from the point to the transceiver element 1, the received sound pressure Pr-r at the transceiver 1 is eventually represented by the following equation (24) with respect to the incident sound pressure at the point given by the equation (22):

$$Pr-r = (1/r)(r_s/r)Ps \quad (24)$$

and also, it is represented by the following equation (25) with respect to the equation (23):

$$Pr-r = (1/r)(r_s/r)^{\frac{1}{2}}Ps \quad (25)$$

The incident sound pressure Pr to the point is fundamentally given by the following equation (26): and the exponent a of the following equation is unitarily determined as the space spreading shape of the ultrasonic wave beam 2 from the transceiver element 1.

$$Pr = \left(\frac{r_s}{r}\right)^a Ps \quad (26)$$

Therefore, the sound pressure Pr−r of the ultrasonic wave received by the transceiver element 1 reflected from the point in the object 6 is given by the following equation (27):

$$Pr - r = \frac{(r_s)^a}{(r)^{a+1}} Ps \quad (27)$$

Since the reflection signal from the point in the object 6 at the scanning point within the spreading range of the ultrasonic wave beam is added in the image reproduction based on the synthetic aperture method according to the present invention, the number of adding data increases proportionally to the distance r. Consequently, as a result of image reproduction from the received sound pressure by the equation (27), the reproduced result Fr at the distance r of the output of the accumulator 17 in FIG. 5 is represented by the following equation (28):

$$Fr = \left(\frac{r_s}{r}\right)^a Ps \quad (28)$$

And it is understood that the depending term of r still exists. This means that the data for the line image as the output of the accumulator 17 in FIG. 5 has the reproduction intensity depending upon the distance r of the point even if the point has the same reflecting intensity in the object. In FIG. 7, when the points 21 and 22 are reproduced, the point 21 is intensified by $(r_2/r_1)^a$ as compared with the point 22. In other words, the reproduced image is corrected by erasing the r depending term in the equation (28), and it is resultantly understood that the correcting value Cr determined by the following equation (29) is multiplied by the data for the line image in the distance r.

$$Cr = r^a \quad (29)$$

Therefore, since r in the equation (29) corresponds to Zok (Refer to the equation (15)) in FIG. 6, (K, $C_{Zok}$)

calculated in advance according to the equation (29) is written to be stored into the correcting value table 15 in FIG. 5 by substituting said r for Zok, the output of the accumulator 17 is multiplied by the multiplier 18 by the correcting value $C_{Zok}$ read out of the table 15 synchronously with the k address, and the multiplied result may be stored as the image data into the position of the k address of the image memory 19. In the above description, the sound pressure directivity of the ultrasonic wave beam 2 and the incident angle dependence of the reflecting intensity at the point are not considered for the correcting value $C_{Zok}$ (where $C_{Zok}$ is the correcting value varying in response to the value K of the k address). However, if their physical values are known, it is apparent that $C_{Zok}$ may be calculated by including them.

Next, the operation of this embodiment will be described. An ultrasonic transceiver element 1 is moved to the next scanning point on the object 6 to be inspected. An ultrasonic wave is transmitted from the element 1 into the object 6, and its echo is received by the element 1. This received signal is sequentially A/D converted by the A/D converter 9 into a discrete digital value. The data in the waveform memory 13 is line-shifted by one row, and the digital value converted by the converter 9 at this line-shifting time is sequentially stored into the position according to the T address of the row (first row) for storing the latest data in the waveform memory 13 by the sequential assignment of the T address from the image reproduction controller 16. At this time, the data in the row corresponding to the T address of the memory 13 is sequentially line-shifted by one row. Therefore, the oldest data (data stored in the M-th row) in the memory 13 before storing the latest digital value by one line into the memory 13 is discarded out of the memory 13 by this line-shifting. Thus, after the digital value at the current scanning point is stored into the memory 13 by one line, the controller 16 delivers the above mentioned (i, J) address taken out according to the k address from the table 14 to the memory 13. The method of outputting the (i, J) address at this time includes the steps of outputting address information corresponding to one TOF locus line for calculating one picture element data for one k address, and sequentially outputting the information in response to the TOF locus line. When the address information (i, J) corresponding to one TOF locus line is sequentially output to the memory 13, the data of the digital value stored in the address is output to be accumulated from the memory 13 to the accumulator 17 as the data of one picture element before correction. Thus, the data of each picture element before correction is sequentially accumulated by one line by the accumulator 17, and the accumulated result is output sequentially to the multiplier 18. The correcting value $C_{Zok}$ from the table 15 is produced according to the k address corresponding to the data of the picture element as the accumulated result by the controller 16 synchronously with the output of the accumulator 17, and applied to the multiplier 18. Therefore, the picture element for the line image before correction as the accumulated result of the accumulator 17 is multiplied by the multiplier 18 by the correcting value $C_{Zok}$ to be corrected. The data is thus sequentially corrected and the corrected data for the line image output from the multiplier 18 is sequentially stored into the memory 19 according to the k address output from the controller 16. Thus, the data for the line image of the line segment 1 of the central line in the synthetic aperture range where the present scanning point is used as the end point is stored into the memory 19. The data for the line image is transferred from the memory 19 to the display unit 20 to be made into one line image. Then, the transceiver element 1 is sequentially moved in the scanning direction on the object 6 to be inspected, and the above operation is repeated to display the two-dimensional image as the section of the object 6 on the display unit 20. The above operation was made by accumulation, the accumulation may also include the case of addition.

In the embodiment described above, the case where the TOF locus line table 14 in FIG. 5 is constructed as an address table has been described. However, as another example of the method of the invention, a TOF locus line table 14 is constructed as a table of amount of delay to be described later. This will be described with reference to FIG. 8. FIG. 8 is an explanatory view showing the relationship of the TOF locus line table 14 in the waveform memory 13 in cases where the point $l_k$ to be imaged (where k is specified to a certain value) in FIG. 6 is imaged to be reproduced. In FIG. 8, symbol $PL_k$ denotes the TOF locus line for the point $l_k$ to be imaged, symbol $PL_{k-1}$ denotes the TOF locus line for the point $l_{k-1}$ to be imaged, and the TOF locus lines are actually provided for the points to be imaged on the line segment 1, but only two of them are shown for the convenience of description. All the addresses in the memory 13 in FIG. 5 corresponding to the TOF locus line $PL_k$ are represented by $(i_k, J_k)$. The maximum row $i_k^{max}$ and the minimum row $i_k^{min}$ on the line $PL_k$ are obtained by the equations (19) and (20). When the point $l_k$ to be imaged is imaged to be reproduced, J address corresponding to $i_k = i_k^{min}$ (or $i_k^{max}$) is represented by $J(i_k^{min})$ (or $J(i_k^{max})$). Where i falls within the range of $i_k^{min} \leq i \leq i_k^{max}$, the address on the TOF locus line $PL_k$ in i-the row (row address i) is represented by $(i_k, j(i_k))$. This, the address difference $\Delta J(i_k)$ between the above mentioned column address $J(i_k^{min})$ and the column address $J(i_k)$ of the above mentioned address is obtained, and this address difference is used as the delay amount. Here, since the $i_k$ is equal to i, the address difference $\Delta J(i_k)$ is obtained for all $i_k$ in the range of $i_k^{min} \leq i_k \leq i_k^{max}$. Naturally, the address difference $\Delta J(i_k)$ becomes the minimum value 0 at the addresses $(i_k^{min}, j(i_k^{min}))$ and $(i_k^{max}, J(i_k^{max}))$ (the delay amount becomes 0), and becomes the maximum value at the address of the point $l_k$ (the delay amount becomes maximum). If the memory 13 consists of a shift register group and the data stored in each address $(i_k, j(i_k))$ is shifted by the address difference $\Delta J(i_k)$ (in the delayed form) in case of shifting all the data in the direction (column direction) of the arrow in the drawing, the data on the TOF locus line $PL_k$ are not aligned on the hyperbolic curve but on one column in the drawing after shifting the data. Accordingly, if the data aligned on one column is accumulated, it is based on obtaining one picture element data for the point $l_k$ to be imaged. Actually, this is also carried out in regards to the picture element corresponding to the point to be imaged on the line segment 1. Here, the difference of the column address in the rows between the TOF locus line $PL_k$ and the TOF locus line $PL_{k-1}$ is obtained and held. In other words, the maximum value and the minimum value of the row address i for the TOF locus line $PL_{k-1}$ are obtained by the equations (19) and (20) as $i_{k-1}^{max}$ and $i_{k-1}^{min}$. The column address corresponding to $i_{k-1}^{max}$, $i_{k-1}^{min}$ are represented by $J(i_{k-1}^{min})$. The range of the row address i on the TOF locus line $PL_{k-1}$ is made $i_{k-1}{}^{min} \leq i \leq i_{k-1}{}^{max}$, and also $i = i_{k-1}$. Then, when the address on the i-th row TOF locus line $PL_{k-1}$ is represented by $(i_{k-1}, J(i_{k-1}))$ and the address on the same row TOF locus line $PL_k$ is represented by $(i_k, J(i_k))$, the column address difference $\Delta J(i_k, {}_{k-1})$ of both the TOF locus lines $PL_k$, $PL_{k-1}$ is represented by the following equation (30):

$$\Delta J(i_k, i_{k-1}) = J(i_k) - J(i_{k-1}) \quad (30)$$

Therefore, when the data on the TOF locus line $PL_{k-1}$ is shifted and aligned on one column in the memory 13, the data on the TOF locus line $PL_k$ is shifted by each column address difference $\Delta J(i_{k-1}, i_{k-2})$ with respect to each row. Thus, the data of the TOF locus line $PL_{k-1}$ are aligned in one row, accumulated by the accumulator 17, and then the data are further shifted by $\Delta J(i_k, i_{k-1})$. Then, the data on the original TOF line $PL_k$ is aligned on one column, and may be accumulated by the accumulator 17. Accordingly, all the values of 1 to $k^{max}$ are taken without specifying the k, calculated according to the equation (30), the combination of $(k, i, \Delta J(i_k, _{k-1}))$ (where k is the variable of $1 \leq k \leq k^{max}$) including $\Delta J(i_k, i_{k-1})$) are tabled to be stored into the TOF locus line table 14 in FIG. 1. Thus, the data are sequentially shifted and added for all the points to be imaged on the line segment 1 from $(k, i, \Delta J(i_k, i_{k-1}))$ to obtain all the picture element data. In addition, there is a method of shifting reversely (rightward) to the direction of the arrow of the drawings. The deepest end point of the line segment 1 is represented by $1_k{}^{max}$, and the data in the memory 13 on the TOF locus line $PL_k{}^{max}$ corresponding to the point $1_k{}^{max}$ to be imaged is shifted rightward by the shifting amount $\Delta J(i_k)$ according to the above mentioned $(i_k, J(i_k))$. Then, the data as to the TOF locus line $PL_k{}^{max}$ is aligned in one column. The data relating to the next TOF locus line $PL_k{}^{max}{}_{-1}$ is disposed at the position displaced by the address amount of the address difference $\Delta J(i_k, i_{k-1})$ of the equation (30), and when the data is shifted rightward by the address difference $\Delta J(i_k, {}_{k-1})$, the data is aligned in one column. With respect to the remaining TOF locus line $PL_k{}^{max}{}_{-2}, \ldots ,$ $PL_1$, the data is shifted rightward similarly to the TOF locus line $PL_k{}^{max}{}_{-1}$ by the equation (30), and resultantly aligned in one column. Thus, when the shifting amount $\Delta J(i_k{}^{max})$ and $\Delta J(i_k, {}_{k-1})$ are calculated in advance to be tabled and stored in the table 14, the picture element data for all the points to be imaged on the line segment 1 can be obtained as described above. Of course, the data shifted and aligned on one column is accumulated by the accumulator 17, multiplied by the multiplier 18 by the correcting value $C_{Zok}$ after the accumulation, and displayed as the corrected picture element data.

The above embodiment has been described in the case that the transmitting and receiving ultrasonic waves are ultrasonic pulse waves. However, even if the transmitting and receiving ultrasonic waves may be given by linear frequency modulation (a so-called a chirp signal), entirely the same advantages as those of the above embodiment can be expected only by using a chirp signal generator instead of the pulse generator 7, and by additionally providing a correlator between the amplifier 8 and the A/D converter 9 for calculating the mutual correlation of the output signal from the amplifier 8 in FIG. 5 with the chirp signal from the chirp signal generator 7 as the reference wave.

The above embodiment has been described for cases where the ultrasonic transceiver element is mechanically scanned. However, even if the ultrasonic transceiver element made of an array configuration is electronically scanned, an electronic relay is added rearward the element 1 in FIG. 5, and a relay switching control function of the electronic relay may be added to the measuring system controller 11. The waveform memory 13 in FIG. 5 has been formed as a frame memory configuration of $M \times N$. However, the frame memory 13 in the embodiment described above is not always necessary, but may be formed of necessary maximum capacity configuration for the object to be applied of the apparatus, and it is apparent that the area to be imaged of the memory 13 used in case of reproducing the image may have $M \times N$ area being pushed to the left-upper side.

Further, even if the multiplier 18 in FIG. 5 is provided between the image memory 19 and the image display unit 20, the same advantages as those of the embodiment described above may be obtained.

The above embodiment has been described with respect to the method of imaging an object by ultrasonic waves, but in case of electromagnetic waves, i.e., the method of imaging an object (or the surface of the object) by pulse radar may provide entirely the same advantages as those of the above embodiment.

Figure 9:
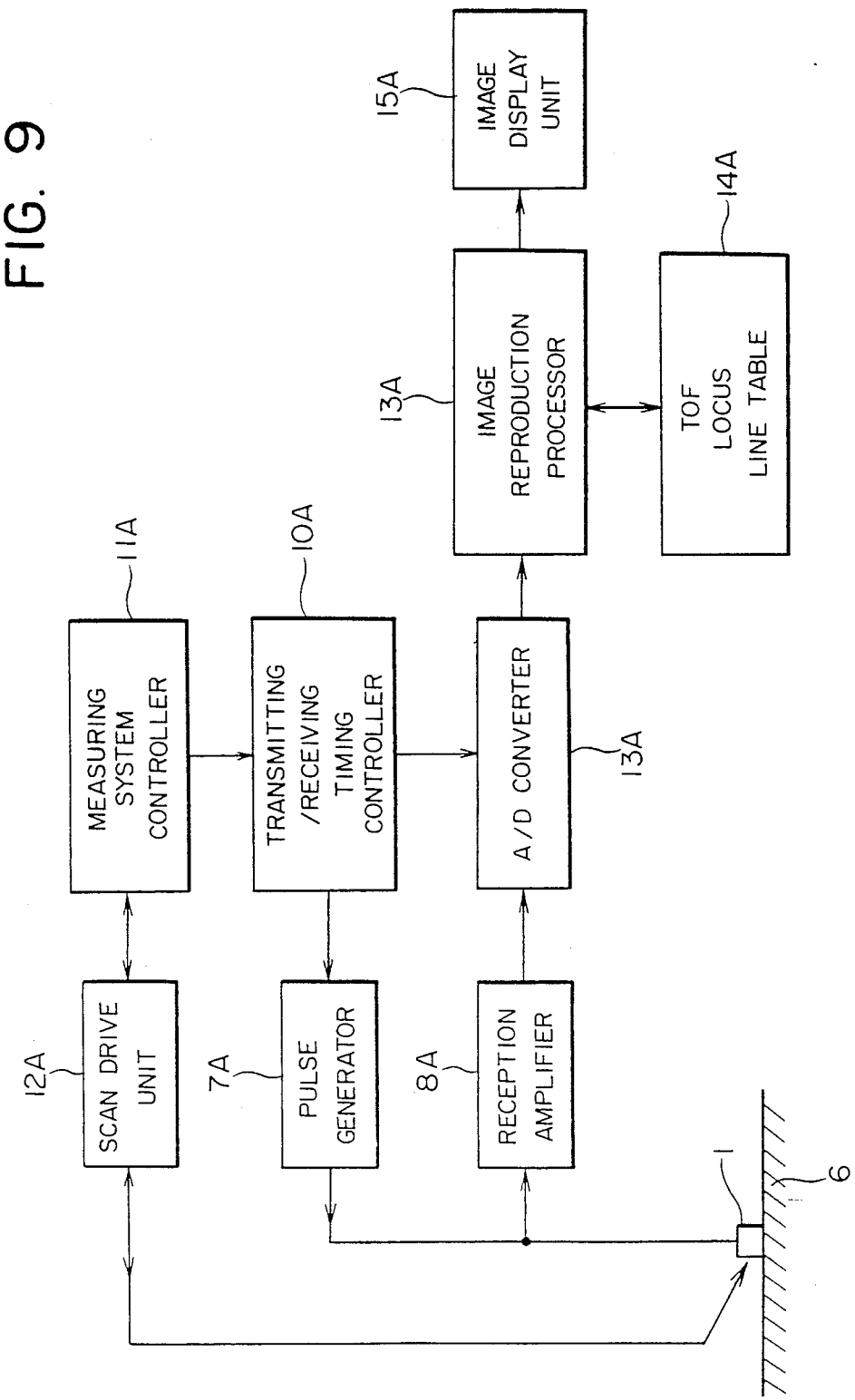
FIG. 9 is a view showing the general arrangement of an object imaging apparatus applying the method of the invention.

FIG. 9 is a block diagram of another example of an apparatus for imaging object by ultrasonic or electromagnetic waves applying the method of the present invention. In FIG. 9, reference numeral 1 denotes an ultrasonic wave transceiver element having aperture d and capable of transmitting the ultrasonic wave beam having spreading angle $\theta\omega$ and receiving the echo of the beam, and numeral 6 denotes an object or substance to be inspected. The internal defect of the object 6 is imaged by imaging the interior of the object 6 by the transceiver element 1. Numeral 7A denotes a pulse generator for applying spike-shaped pulse voltage to the element 1 to transmit the ultrasonic wave signal into the object 6 from the element 1, numeral 8A denotes a reception amplifier for amplifying the received signal obtained by the element 1, and numeral 9A denotes an A/D converter for A/D converting the received signal amplified to a predetermined level by the amplifier 8A to produce a digital value to form the discrete signal with a predetermined sampling time from the continuous signal (analog signal). Numeral 10A denotes a transmitting/receiving timing controller to generate a timing signal for applying pulse voltage to the element 1 from the generator 7A and to generate a timing signal for controlling the starting time for the A/D converter 9A to A/D convert the received signal. Numeral 11A denotes a measuring system controller comprising a microcomputer, for example, to entirely control the measuring system for providing a control signal for generating the timing signal to the controller 10A, for generating control signal for scanning the element 1 on the surface of the object 6 and for controlling timing for inputting position information when the element 1 transmits and receives the ultrasonic wave through a scan drive unit 12A of an encoder (not shown) of the element 1. Numeral 12A denotes a scan drive unit for scanning the element 1 by the scan control signal from the controller 11A, numeral 13A denotes an image reproduction processor made of a waveform memory for sequentially storing the discrete digital value obtained by the A/D converter 9A by every measurement at the scanning point and sequentially imaging and reproducing while referring to a TOF locus line table 14A to be described later. Numeral 14A denotes a TOF locus line table for imaging and reproducing points on the line to be imaged from the received signal group in the above mentioned synthetic aperture range, and also, it denotes an address table in which address information is written for reading out the corresponding value in the received signal train corresponding to the scanning point according to the TOF locus line necessary to image and reproduce each point to be imaged on the line to be imaged as will be described, and providing the address information to the processor 13A. Numeral 15A denotes an image display unit for D/A converting the reproduced image value by one line obtained from the processor 13A and sequentially line-shifting to continuously display the plane image in an updated manner.

Figure 10:
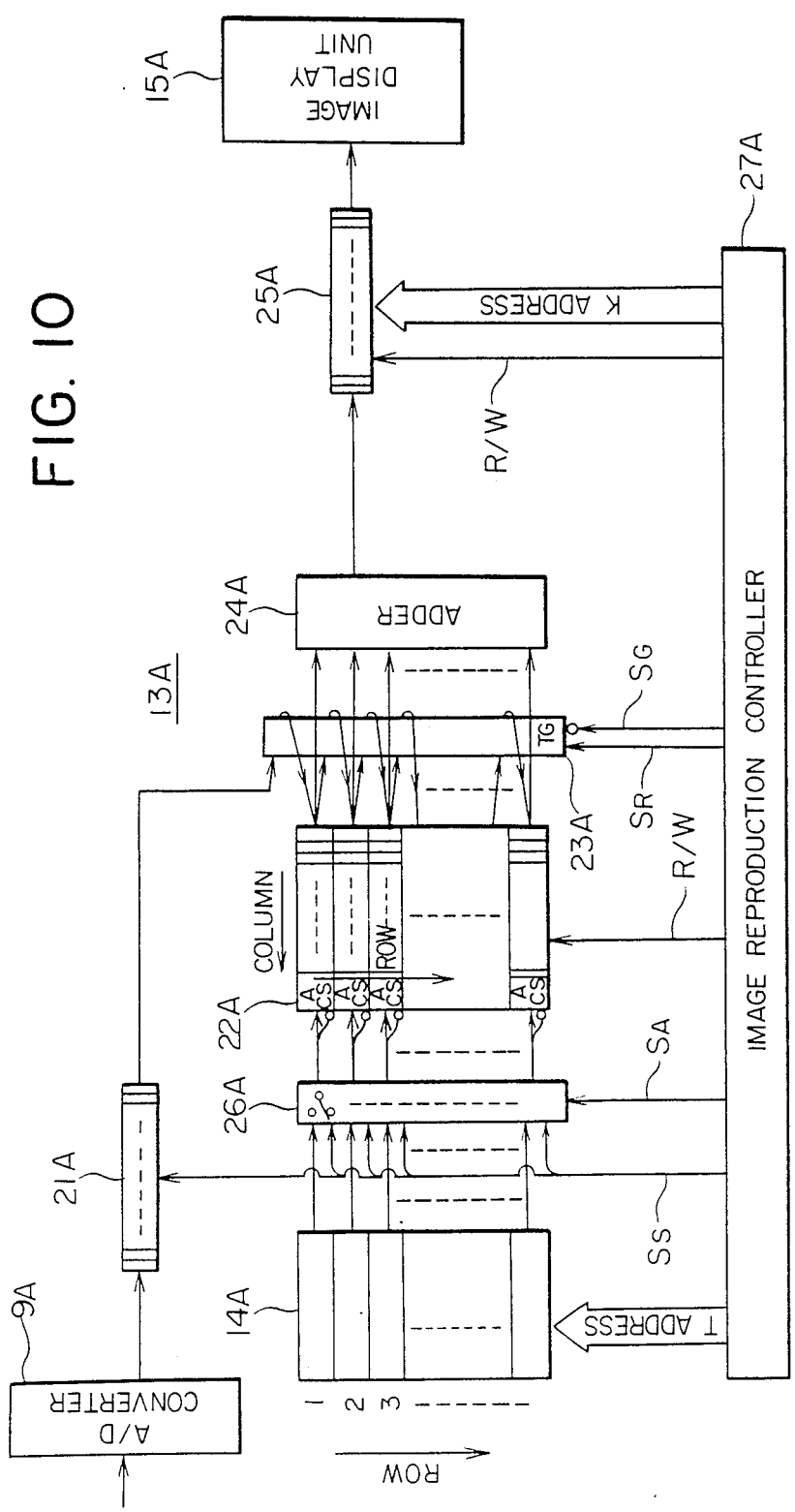
FIG. 10 is a detailed block diagram of an image reproduction processor shown in FIG. 9.

FIG. 10 is a detailed block diagram of the image reproduction processor 13A. In FIG. 10, numeral 21A denotes an A/D memory for sequentially storing discrete digital value train obtained from the A/D converter 9A to temporarily store one line data train (i.e., digital value discrete at a certain sampling period) at one scanning point in cooperation with the converter 9A (not shown). Numeral 22A denotes a waveform memory for sequentially storing one line data trains transferred from the A/D memory 21A, and in FIG. 10, one row in the line memory denotes one line memory to form the line memory of several rows (M pieces). Address and chip select signal of each line memory are independently supplied by an address switch 26A to be described later, and read/write signal (hereinafter referred to as "R/W signal") is supplied commonly to each line memory from an image reproduction controller 27A to be described later. In other words, in the waveform memory 22A, all the line memories are simultaneously accessed by the independent addresses. Numeral 23A denotes a latch gate operating when storing the data train from the A/D memory 21A into the line memory at the uppermost row of the waveform memory 22A in the drawing simultaneously with the line shifting of the waveform memory 22A for latching the i-th row data of the waveform memory 22A to be connected to input the data through the gate to the (i+1)-th memory of the waveform memory 22A. More specifically, the latch gate 23A latches the data of the j-th column of each row of the waveform memory 22A, and displaces by one row downward to store into each row of the same j-th column of the memory 22A and latches the data of the j-th column received from the memory 21A to store into the j-th column at the uppermost row of the memory 22A. Numeral 24A denotes an adder for adding in parallel data groups obtained from the memory 22A simultaneously, and numeral 25A denotes an image memory for storing the added one picture element data to sequentially store the image data by one line into the address indicated by the K address. Numeral 26A denotes an address switch for selecting the chip select signal and address information J of the line memory independently supplied from the TOF locus line table 14A, and the memory address signal Ss fed through a memory shifting address bus including the chip select signal of the line memory supplied from the image reproduction controller 27A to be described later by a switch signal SA to supply the address and the chip select signal independently to the line memory of the memory 22A. Numeral 27A denotes an image reproduction controller for generally controlling the above image reproduction processing system to control T address for simultaneously reading out and controlling the memory group similar to the memory 22A for storing the address information stored in the TOF locus line table 14A by calculating in advance, i.e., the chip select signal and the column address data J of the column of the line memory in the memory 22A, memory shift address for designating the line shifting of the memory 22A and data train to the memory 22A at the inputting time, address switch signal $S_A$ of the address switch 26A, R/W signal for controlling the R/W operation of the memory 22A, latch signal $S_R$ and gate signal $S_G$ of the latch gate 23A operated at the line shifting time, and K address and R/W signal for designating the position in case of writing the data by one picture element into the image memory 25A. The T address to the table 14A and the K address to the memory 25A are similar to each other and both of them are sequentially addressed stationarily by the address of the memory 25A from 1.

Figure 12:
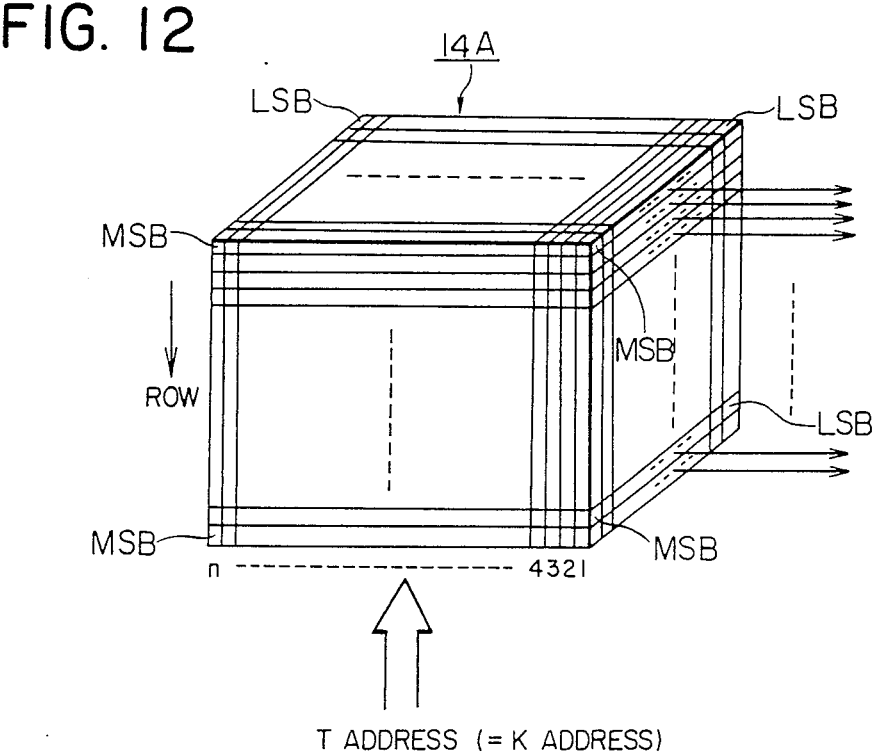
FIGS. 12 and 13 are explanatory views showing arraying formats for storing address information obtained in FIG. 11 of the TOF locus line table.
Figure 13:
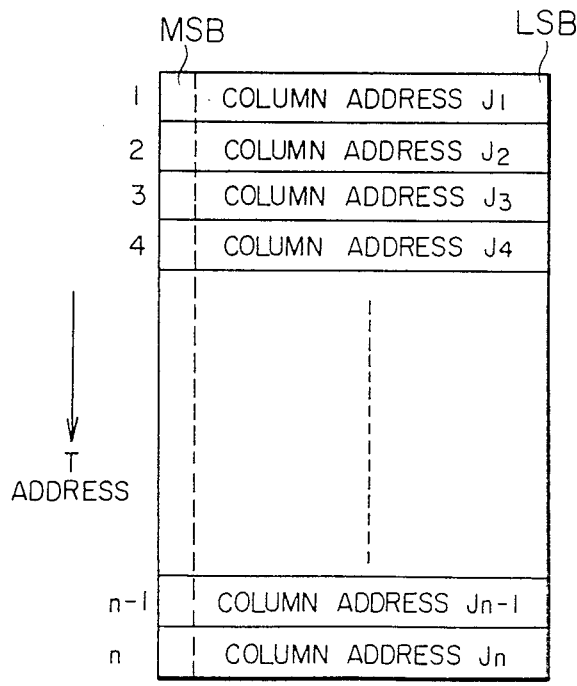

FIGS. 12 and 13 show one example of a status format formed in the TOF locus line table 14A of the row address i, column address J and address value K obtained by calculating in advance as described above. FIG. 12 shows an arraying format in the table 14A for independently accessing simultaneously by one line memory cell (one row cell) the waveform memory 22A of the apparatus applied by the embodiment of the method of the invention, and thus assembling a TOF locus line table by every row to independently access simultaneously each row of the memory 22A in the table 14A. For example, one of the T addresses (K addresses) corresponds to one point to be imaged on the line segment to be imaged, and the address information for accessing all the data in the memory 22A on the TOF locus line of the point to be imaged is simultaneously output from the table 14A for each row in the memory 22A. In FIG. 12, the numerals 1, 2, . . . , n at the lowermost portion denote T addresses (K addresses). For example, when the address of T=1 is designated, the bit information of all the address information as to one TOF locus line of each row corresponding to each row of the memory 22A are independently output simultaneously. However, the logic values "1", "0" shown in the MSB bit unit are chip select signals for turning ON or OFF the data output of the line memory of the memory 22A. Therefore, the bit information (column address J) as the address information is represented by the next bits of the MSB to the bit of LSB. In FIG. 13, one column address J, i.e., T address is representatively indicated for calculating one picture element for one MSB (chip select signal) and one column address for one value, but the number of the MSB and column addresses corresponding to the number of rows of the memory 22A are actually necessary for calculating one picture element so as to be output from the table 14A. Each T address is for outputting the address information for calculating each picture element from the table 14A, and n pieces of T addresses are made to be able to calculate n pieces of picture elements, and one line segment l is formed of n pieces of picture elements.

In the foregoing description, the K address has been described to be equal to a T address because a single counter is shared for generating the K and T addresses.

Figure 14:
FIG. 14 is a general timing chart showing the sequence of the operation of the apparatus.

FIG. 14 is a timing chart for explaining the operation of the above mentioned apparatus. In FIG. 14, (a) shows the transmission of ultrasonic waves, (b) shows the clearing of the waveform memory 22A, (c) shows A/D conversion, (d) shows the inputting and shifting of data to the waveform memory 22A, (e) shows image reproduction, and (f) shows the image data transfer, wherein hatched portions illustrate the operating states.

Next, the operation of the apparatus according to the embodiment of the invention will be described with reference to FIGS. 9, 10, 12, 13 and 14. To clear the entire area of the memory 22A before starting measurement, the latch gate 23A is closed by gate signal $S_G$ from the image reproduction controller 27A to be cleared by R/W signal from the controller 27A by the number of rows (N) while sequentially updating the column address, i.e., the memory address of the memory 22A from 1. Then, the ultrasonic transceiver element 1 starts transmitting or receiving the ultrasonic wave at the scanning point, the received signal is converted by the A/D converter 9A from analog value to digital value, and stored into the A/D memory 21A. The stored data is input as the image data by the latest one line from the image reproduction controller 27A by signal Ss given through the memory shifting address bus to the uppermost row of the waveform memory 22A, and the existing line data stored in each row of the memory 22A is shifted by one line (one scanning line) downward in FIG. 10 by every one row. In other words, the data of the j-th column of each row of the memory 22A accessed by the memory shifting address signal Ss obtained through the memory shifting address bus and the address switch 26A from the controller 27A is latched by the latch gate 23A by the latch signal $S_R$ from the controller 27A, and when the data is again stored into the memory 22A from the latch gate 23A, the data is input and stored in the form of shifting by one row to next row through a gate (not shown) as the j-th column data of the next row. At this time, the data in the A/D memory 21A similarly accessed by the above mentioned memory shifting address signal Ss is input as the new input data through the latch gate 23A from the uppermost input unit of the memory 22A, and the j-th column new data is written into the uppermost row by the R/W signal from the controller 27A, and then completely written simultaneously into the j-th column of the data latched to the gate 23A. The above series of operation is repeated sequentially by the times of the number of columns to thereby input new data by one line in the memory 21A and to complete the entire shifting of one row of data in the memory 22A.

Then, when the MSB and the column address information J as the chip select signal stored in the table 14A are accessed by the T address signal controlled by the controller 27A, the J address signal and the MSB chip select signal are simultaneously supplied to each row of the memory 22A through the address switch 26A switched by the switch signal Ss from the controller 27A, and a series of data group is simultaneously output from each row of the memory 22A to the adder 24A. Said data group is the data along one TOF locus line, and the total sum of the data group is the calculated value of one picture element value, i.e. one picture element necessary to reproduce the image by one line to be stored in the memory 25A, and the data group is further output simultaneously in parallel by all rows to be added simultaneously by the adder 24A. Thus, the calculating time of one picture element is largely shortened. More specifically, when the controller 27A once accesses the table 14A, the calculation of one picture element is finished, and the data to the image memory 25A for storing the data of the picture element by one line is stored completely by sequentially updating in response to the number n of picture elements for forming the image by one line by the T address for accessing the table 14A.

The data is written into the memory 25A by the same K address as the T address given from the controller 27A and the R/W signal.

The data for the line image by one line obtained as described above is transferred to the image display unit 15A of next stage, and the reproducing process of the data for the line image by one line to be transmitted and received of the first time ultrasonic wave is completed. Then, the transmission and the reception of ultrasonic wave after the second time is conducted by the transceiver element 1 moved to the scanning point on the corresponding object 6 to be inspected to transmit and receive the ultrasonic wave, the same processing operation as described above is conducted without clearing the memory 22A to sequentially continue the transmission and the reception of the ultrasonic wave to thereby reproducing the image in the infinite area.

Figure 15:
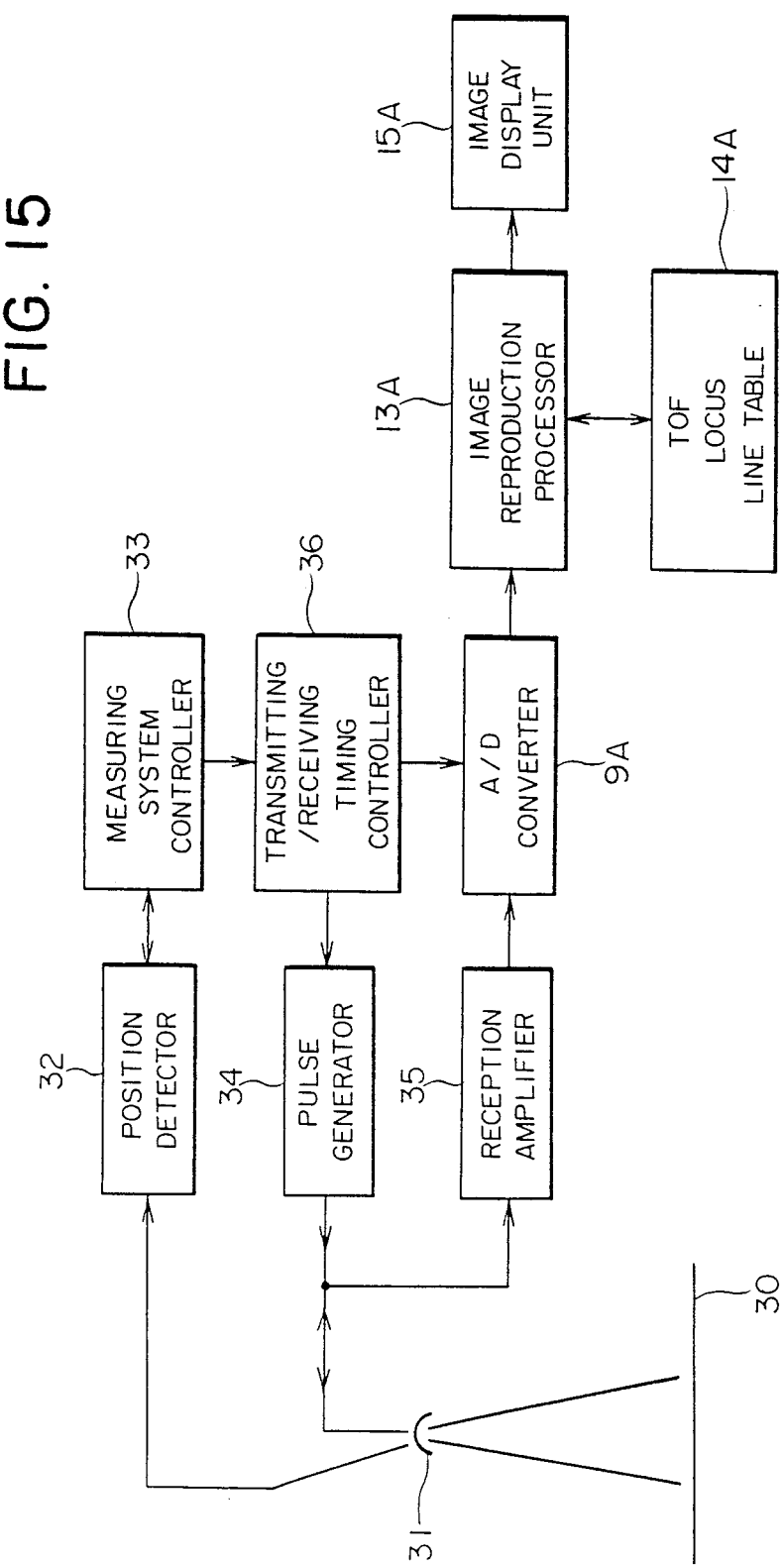
FIG. 15 is a block diagram showing another object imaging apparatus applying the method of the invention.

FIG. 15 is a block diagram of another example of an apparatus applying the method of the invention. The apparatus is shown as an apparatus of electromagnetic waves instead of the ultrasonic wave shown in FIG. 9. In FIG. 15, the same symbols as those in FIG. 9 denote similar or equivalent members. Reference numeral 30 denotes a ground surface, numeral 31 denotes an antenna carried on an aircraft or a satellite for transmitting and receiving the electromagnetic wave beam, and numeral 32 denotes a position detector for inputting the angle of the antenna 31 to the ground surface 30, the position control information of pitch, roll or yaw of the antenna. A measuring controller 33, a pulse generator 34, a reception amplifier 35 and a transmitting/receiving timing controller 36 perform the similar functions as the measuring system controller 11A, the pulse generator 7A, the reception amplifier 8A and the transmitting/receiving timing controller 10A described with respect to FIG. 9, and since they are well known, further description will be omitted.

Next, one embodiment of a second method of imaging an object by ultrasonic or electromagnetic wave according to the invention will be described.

Figure 20:
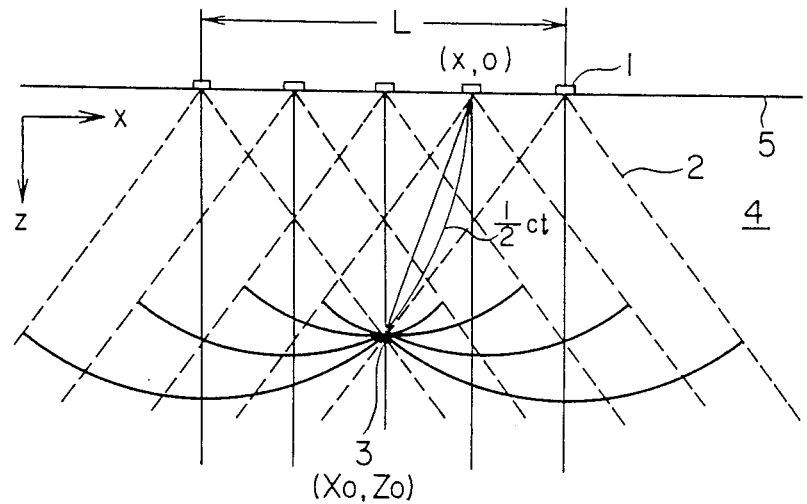
FIG. 20 is a view for explaining the principle behind the method according to the present invention.

The embodiment of the invention will be described in principle so as to readily understand the embodiment of the invention. In FIG. 20, the sampling value of the time t from the transmission to the reception of the received signal at the scanning point of the position (x, 0) is considered to be reflected and received from the object 3 to be imaged at the distance of $\frac{1}{2}(ct)$ in the propagating medium 4, and the space position where the object 3 to be imaged exists is disposed on a circular arc having a radius of $\frac{1}{2}(ct)$ at the position (x, 0) as the center. When this arc is defined as the equal distance line, the equal distance line is defined only within the range (denoted by a broken line in FIG. 20) of the spread of the ultrasonic wave beam 2 shown by the broken line in FIG. 20. When similarly considering the equal distance line at the scanning points of the scanning range determined by the synthetic aperture length L, the equal distance line forms the crossing point at the position of the true spatial point as apparent from the drawing. More particularly, when all the received signal trains at the scanning points in the synthetic aperture range are uniformly distributed to the corresponding equal distance line to the receiving time, the received signal values are accumulated in the form equivalent to the accumulation along the equidistant line at the position on the true point, and the object 3 to be imaged is eventually imaged to be reproduced. At this time, when the equal distance lines corresponding to the receiving time of the received signal train are all stored as the table for all the scanning points, then the capacity of the table memory is extremely increased, resulting in a practical difficulty. Thus, the method of uniformly distributing the received signal group of all the scanning points is now performed by means of referring to the table for only the equal distance line group for one scanning point (common center), namely for only the equal distance line group drawn in a concentric circular-arc shape at one point as the common center.

Figure 21:
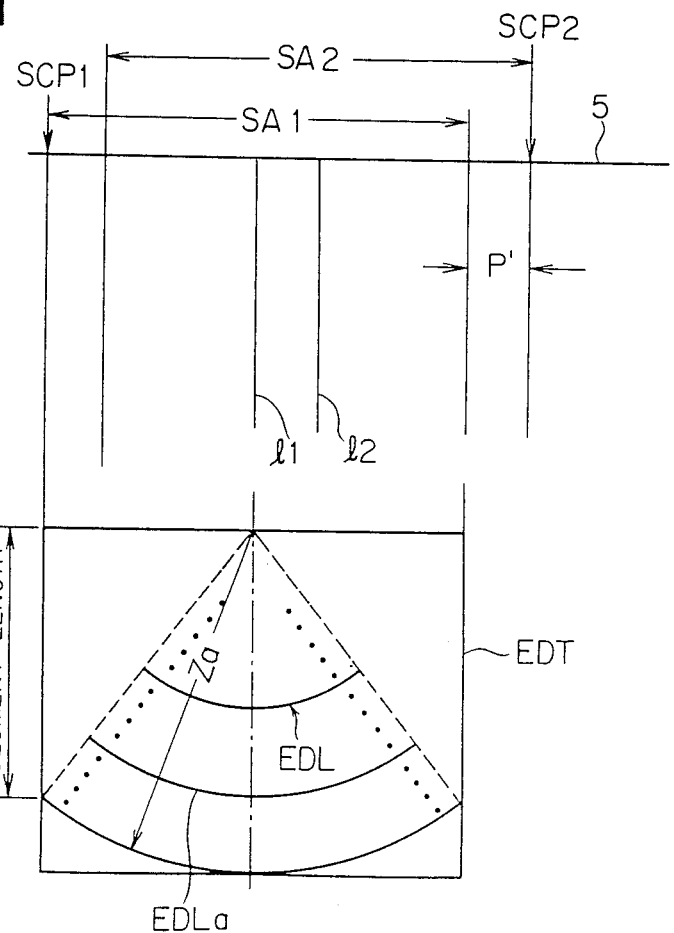
FIG. 21 is a theoretical view for explaining the relationship between the imaging area of the method according to the invention and the equidistant line table used for reproducing an image.

This will be further described in detail with reference to FIG. 21. In FIG. 21, when imaging and reproducing the line segment $l_{-1}$ as the central line of a synthetic aperture range SA1, the received signal is uniformly distributed in a two-dimensional memory (hereinafter referred to as "image memory") formed to be corresponding to the scanning points only in one synthetic aperture range by means of the equal distance line EDL in the equal distance line table EDT shown in the drawing at each scanning point for the received signal group obtained by scanning the synthetic aperture range SA1, and the data at the address in the image memory corresponding to the distribution is added to the signal value of the received signal train uniformly distributed, and stored into the original address. If the content of the image memory is shifted sequentially by one scanning line segment, i.e., one line shifting at every uniform distribution at every scanning point, the data for the line image before correction of the line segment $l_1$ to be imaged is formed at the extreme end of the shifting direction of the image memory at the time when the synthetic aperture range SA1 is all scanned and uniformly distributed completely. Here, the synthetic aperture range is defined as that corresponding to the position separated the farthest from the scanning point to be imaged and to be reproduced. Then, in case that the line segment $l_2$ to be imaged and to be disposed at the position separated by one scanning point P' from the line segment $l_1$ to be imaged is imaged to be reproduced, the received signal group of the synthetic aperture range SA2 is imaged to be reproduced by using entirely the same equal distance line table as that used for imaging and reproducing the line segment $l_1$ to be imaged. In other words, the synthetic aperture range SA1 is scanned and uniformly distributed in the image memory, and the data of the adjacent row to the data formed at the extreme end as the data for the line image of the line segment $l_1$ to be imaged is made to be the data for the line segment $l_2$ to be imaged. Therefore, if the image memory is line-shifted by one scanning line, i.e., one row in the row direction to sweep out the data for the line image of the line segment $l_1$ to be imaged and to uniformly distribute the received signal train obtained at the scanning point SCP2 into the image memory according to the address information corresponding to the equal distance line EDL in the equal distance line table EDT, the data for the line image before correction of the line segment $l_2$ to be imaged is formed at the extremely end row of the image memory. When such a processing operation as above is repeated, the two-dimensional image can be reproduced as an assembly of line picture elements.

More specifically, when sequentially scanning the ultrasonic transceiver element, transmitting and receiving the ultrasonic wave, and uniformly distributing by the equal distance line table EDT so as to be accumulated to be stored into the image memory, it is understood that the line data extracted by line-shifting from the image memory is made to be the data for the line image before the correction to be imaged and reproduced, if all the received signal group in the image memory is line-shifted by just one scan, the received signal train currently obtained in the image memory after line-shifting is uniformly distributed according to the equal distance line EDL in the equal distance line table EDT, the corresponding data in the image memory is accumulated to be stored in case of uniform distribution, and said processes are sequentially repeated. When the data for the line image thus obtained is corrected as will be described and scrolled to be displayed, the two-dimensional plane image is displayed as the assembly of the line image, and the line image is sequentially added at every scanning of the ultrasonic transceiver element to update the image. At this time, the row line on the image memory corresponding to the scanning points on the image memory is made to be the central line in the row direction.

More particularly, it may be considered as described below by means of replacing the equal distance line table EDT in FIG. 21 by the image memory having the capacity corresponding to the scanning points only in one synthetic aperture range. The received signal train obtained from the scanning point (I−1) immediately before the arbitrary scanning point I is uniformly distributed to form the circular arc shape in the image memory according to a plurality of the equal distance lines EDL after entirely shifting the image memory by one scanning line to the left side. The uniformly distributed signal value is added to the data at the corresponding address in the image memory, and this added value is stored at the same address, and then the data in the image memory is updated. Then, the data of one vertical row at the left end in the image memory is sequentially taken out, and the data in the image memory is entirely line-shifted by one row, i.e., by one scanning line in the leftward direction. The data of one vertical row at the left end in the image memory taken out as described above is the data for the line image of one line segment to be imaged. Then, the received signal train obtained from the scanning line I is uniformly distributed by the same equidistant line EDL as well as the signal train obtained at the scanning line (I−1) being uniformly distributed in the image memory according to a plurality of the arc-shaped equidistant lines EDL. In this uniform distribution, if the received signal obtained is "1" in the received signal train corresponding to the scanning point I when the receiving time corresponding to the distance Za is elasped, the address information corresponding to the equidistant line $EDL_a$ corresponding to the distance Za is taken out of the equidistant line table EDT, the value stored at the corresponding address in the image memory and the above signal "1" are added according to the address information, and the added result is stored at the same address in the image memory. When the data in the image memory is thus updated, the data of one vertical row at the left end in the image memory is taken out as the data for one line image before correction of the line segment to be imaged, and the content of the image memory is line-shifted to the left side by one row to be prepared for the next uniform distribution. The above operation is repeated to obtain the sequential data for the line image before correction, and the data for the line image is corrected to be sequentially displayed so as to obtain the two-dimensional image.

Figure 16:
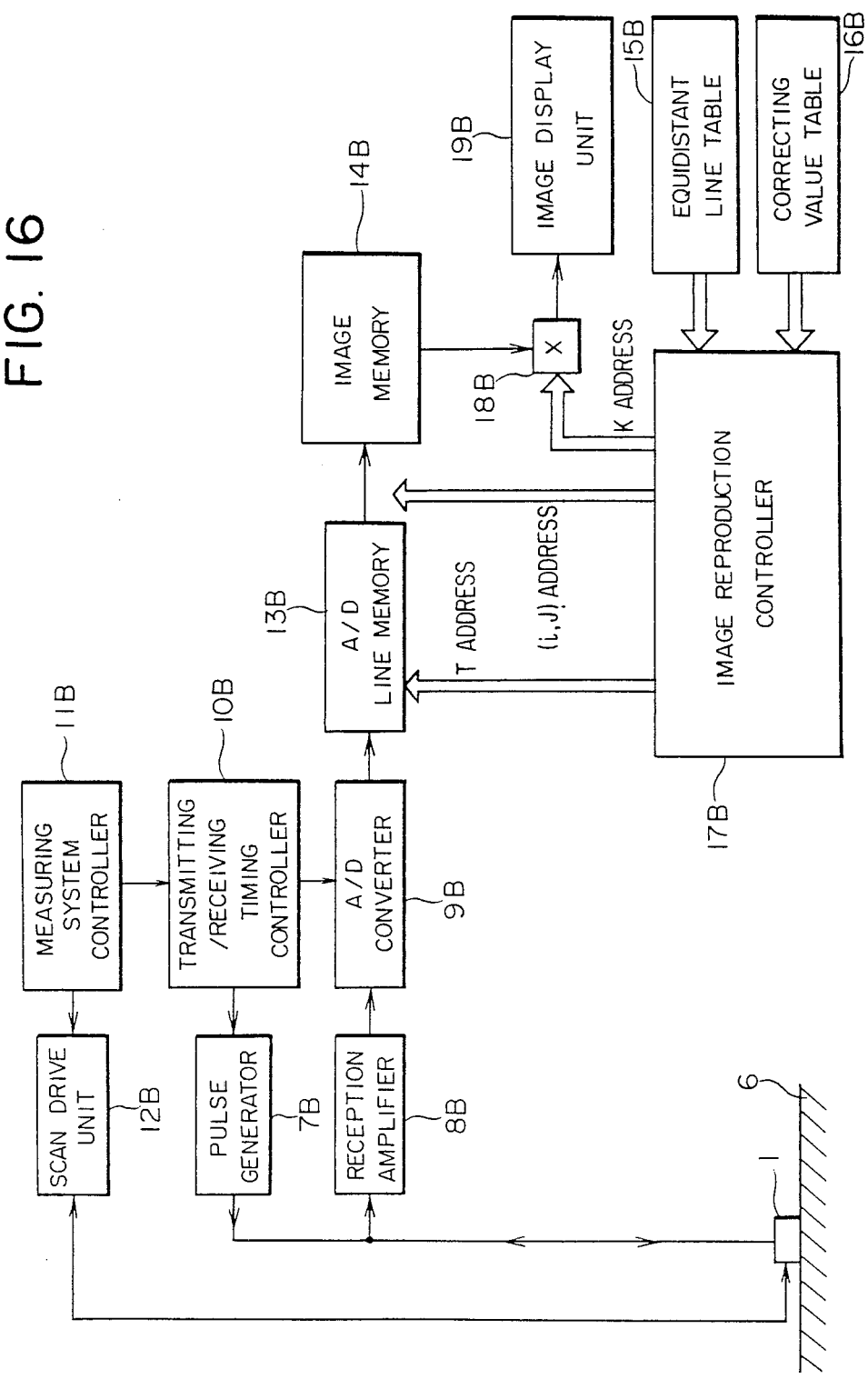
FIG. 16 is a functional block view for explaining in detail an apparatus applying the method of the invention.

FIG. 16 is a functional block diagram shown to concretely describe another embodiment of the invention. In FIG. 16, reference numeral 1 denotes an ultrasonic transceiver element, numeral 6 denotes an object to be inspected, and its internal defect is imaged by means of imaging the interior of the object 6 by the element 1. Numeral 7B denotes a pulse generator for applying a spike-shaped pulse voltage to the element 1 to transmit an ultrasonic wave signal from the element 1 into the object 6. Numeral 8B denotes a reception amplifier for amplifying the received ultrasonic wave signal obtained by the element 1, and numeral 9B denotes an A/D converter for A/D converting the received signal amplified to a predetermined level by the amplifier 8B to obtain the corresponding digital value so as to form the continuous signal into a discrete signal with a predetermined sampling time. Numeral 10B denotes a transmitting/receiving timing controller to generate a timing signal for applying a pulse voltage to the element 1 from the generator 7B and to generate a timing signal for controlling the starting time for the A/D converter 9B to A/D convert the received signal, and numeral 11B denotes a measuring system controller for providing control signal for generating the various timing signals to the controller 10B, for generating a control signal for scanning the element 1 on the surface of the object 6 and for controlling the timing for inputting position information when the element 1 transmits and receives ultrasonic waves through the scan drive unit encoder of the element 1. Numeral 12B denotes a scan drive unit for scanning the element 1 by the scan control signal from the controller 11B, numeral 13B denotes an A/D line memory for temporarily storing the received signal train at one scanning point converted to the discrete digital value by the A/D converter 9B, and numeral 14B denotes an image memory for cumulatively storing by uniformly distributing the received signal train stored in the memory 13B according to the above mentioned equidistant line group and line-shifting the entire area data by one scanning line at every A/D conversion. Numeral 15B denotes an equidistant line table as the reference table for comulatively storing the received signal train by uniformly distributing it into the image memory 14B according to the equidistant line group, and this is formed as the address table for cumulatively storing the received signal train according to the equidistant line represented by the circular arc determined by the time from the transmission to the reception to the memory 14B and the sound velocity to be described later. Numeral 16B denotes a correction value table for tabling the image correcting value for the reproduced picture element corresponding to the column direction address K of the line image sent from the image memory 14B, and this table 16B consists of a line memory having a one-dimensional configuration, for instance, which will be described later. Numeral 17B denotes an image reproduction controller for reading out, and control to generate the (i, J) address value for cumulatively storing from the table 15B for uniformly distributing all the values of the received signal train in the A/D line memory 13B to a predetermined address of the image memory 14B according to the address information in the equidistant line table 15B and for reading out, and controlling to generate the correction value for correcting the data for the line image extracted from the memory 14B at every scanning time synchronously with the column direction address K of the data for the line image. Numeral 18B denotes a multiplier for multiplying the correction value from the controller 17B by the K address image value of the line image data to obtain the corrected and reproduced image data, and numeral 19B denotes an image display unit for displaying the corrected data for line image sequentially obtained as the output of the multiplier 18B by means of sequentially line-shifting (scrolling) to continuously display the area of the image, in an updating manner, as a two-dimensional image assembling the line images.

The image memory 14B, the equidistant line table 15B and the correction value table 16B shown in FIG. 16 will be described in more detail with reference to FIGS. 17, 18 and 19 in a case where the object 6 is of a tubular shape.

Figure 17:
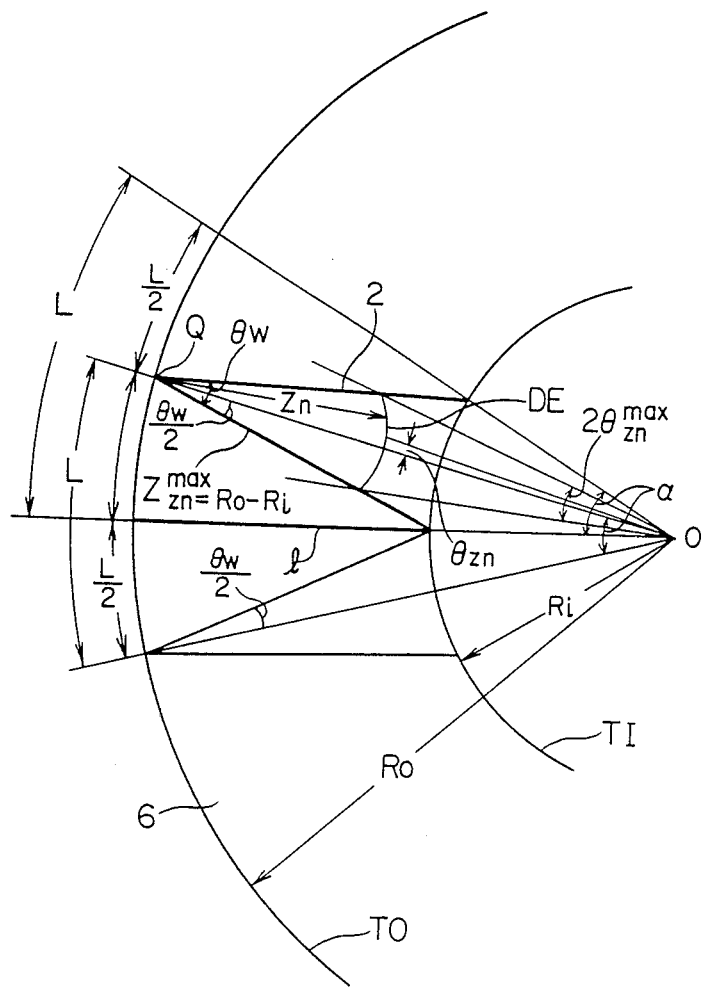
FIG. 17 is an explanatory view of a circular conduit as the object to be inspected for explaining the relationship between an image memory and an equidistant line table with respect to the apparatus shown in FIG. 16.

In FIG. 17, the inner wall of a conduit is TI, the outer wall of the conduit is TO, the center of the conduit is 0, the outer radius of the conduit is Ro, the inner radius of the conduit is Ri, and it is assumed that the ultrasonic transceiver element 1 (not shown in FIG. 17) is scanned circumferentially (e.g., clockwise) on the surface of the outer wall TO of the conduit. When the aperture of the element 1 being scanned is d, the sound velocity in the material of the conduit is C, the central frequency of the transmitted ultrasonic wave from the element 1 is f, the synthetic aperture length on the outer wall TO of the conduit for one point on the surface of the inner wall TI of the conduit is L, the angle at the center O of the conduit for observing the length L is $\alpha$, and the spreading angle of the ultrasonic wave beam 2 of the element 1 is $\theta\omega$, the wavelength $\lambda$ of the ultrasonic wave is represented by the following equation (1a):

$$\lambda = C/f \tag{1a}$$

And therefore, the spreading angle $\theta\omega$ of the ultrasonic wave beam 2 is represented by the following formula (2a):

$$\theta\omega = \lambda/d \tag{2a}$$

The synthetic aperture length L is represented by the following equation (3a) with the angle $\alpha$:

$$L = Ro \cdot \alpha \tag{3a}$$

At this time, the angle $\alpha$ is given by the following equation (4a):

$$\alpha = 2\cos^{-1}\left(\frac{Ro^2 + Ri^2 - \left(Rn\cos\frac{\theta\omega}{2} - \sqrt{Ri^2 - Ro^2\sin^2\frac{\theta\omega}{2}}\right)^2}{2Ro \cdot Ri}\right) \tag{4a}$$

when the time from the transmission to the reception of the n-th digital sampling value of data in the A/D line memory 13B in FIG. 16 is $t_n$ and the sampling time is $\Delta t_R$ in the received signal train at one scanning point, the time $t_n$ is represented by the following equation (5a):

$$t_n = (n-1)\Delta t_R \quad (5a)$$

And the distance (the radius of the arc with the scanning point Q as its center) Zn of the equidistant line for the time $t_n$ is represented by the following equation (6a):

$$Zn = (\tfrac{1}{2})C \cdot t_n \quad (6a)$$

When the defined range of the equidistant line with the distance Zn is considered to be about the angle $\theta_{Zn}^{max}$ at the center O of the conduit shown in the drawing, the angle is given by the following equation (7a):

$$\theta_{Zn}^{max} = \cos^{-1}\left( \frac{Ro - Zn\cos\frac{\theta\omega}{2}}{\sqrt{Ro^2 + Zn^2 - 2Ro \cdot Zn \cdot \cos\frac{\theta\omega}{2}}} \right) \quad (7a)$$

Therefore, when the n-th digital sampling value of the received signal train is uniformly distributed on the equidistant line with distance Zn, the angle $\theta z_n$ (variable) defining the range of the equidistant line based on the central row in the row direction in the image memory 14B shown in FIG. 16 i.e., based on the current scanning point corresponding line is given by the following formula (8a):

$$|\theta Zn| \leq \theta Zn^{max} \quad (8a)$$

If the ultrasonic wave signal propagated the distance to the end point of the equidistant line, namely, the distance $Z_{Zn=Ro-Ri}\text{max}$ between the end of the synthetic aperture length L with the line segment 1 to be imaged as its center (the end shown by L in the drawing) and the point on the inner wall TI of the conduit of the line segment 1 to be imaged (the end point of the equidistant line) in the drawing may be observed as the points on the inner wall surface TI of the conduit on the line segment 1 to be imaged, all the line segment 1 to be imaged in the drawing cannot be imaged to be reproduced unless the ultrasonic wave signal propagated the distance $Z_{Zn=Ro-Ri}\text{max}$ is included as the received signal train and the equidistant line is considered to be included until $Z_{Zn=Ro-Ri}\text{max}$. Here, $Z_{Zn=Ro-Ri}\text{max}$ is given by the following equation (9a):

$$Z_{Zn=Ro-Ri}^{max} = R_n\cos(\theta\omega/2) - \sqrt{Ri^2 - Ro^2\sin^2(\theta\omega/2)} \quad (9a)$$

Therefore, regarding the capacity of the image memory 14B (M×N frame memory configuration) in FIG. 16, the necessary number M and N of rows and columns are respectively given by the following equations (10a) and (11a):

$$M = [L/(Ro\,\Delta\theta)]\text{Gauss symbol} + 1 \quad (10a)$$

$$N = [2Z_{Zn=Ro-Ri}\text{max}/C \cdot \Delta t_R + 0.5]\text{Gauss symbol} + 1 \quad (11a)$$

where $\Delta\theta$ is the angle pitch at the center O of the conduit for the scanning pitch of the element 1. Besides, [ ]$_{Gauss\ symbol}$ represents an operand for converting the numeral in [ ] into an integer.

Here, the method of obtaining the address group (i, J) of uniformly distributing the received signal train into the image memory 14B (FIG. 16) in response to the equidistant line with the distance Zn given by the equation (6a) for one scanning point will be described with reference to FIG. 18.

Figure 18:
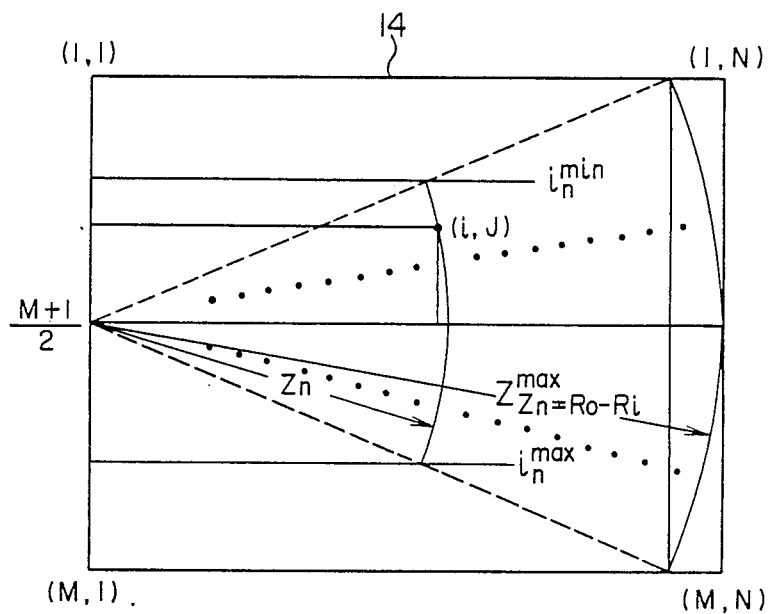
FIG. 18 is a view showing the relationship between an equidistant line table and an image memory.
Figure 19:
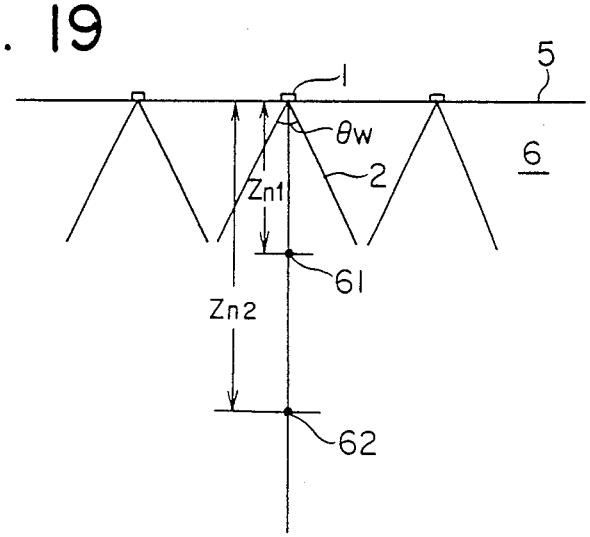
FIG. 19 is a view for explaining the corrected value table in FIG. 16.

FIG. 18 shows the relationship between the image memory 14B having M rows and N columns and the equidistant line table 15B shown in FIG. 16. Considering the i-th row of the memory 14B, the angle $\theta i$ (not shown) at the center O of the conduit in FIG. 17 from the end to the i-th row for the central line $(M+1)/2$ row of the synthetic aperture length L at this time is represented by the following equation (12a) with M from the equation (10a):

$$\theta i = \left(\frac{M+1}{2} - i\right)\Delta\theta \quad (12a)$$

Since the angle $\theta i$ is limited by the equation (8a), the defining range of the row address i on the equidistant line with respect to the distance Zn is given by the following equations (13a) and (14a) with the equations (7a), (8a), (10a) and (12a):

$$i_n^{min} = [(M+1-1)/2 - (\theta_{Zn}^{max})\Delta\theta]_{Gauss\ symbol} \quad (12a)$$

$$i_n^{max} = (M+1) - i_n^{min} \quad (14a)$$

At this time, the column address J on the equidistant line with the distance Zn is given by the following equation (15a):

$$J = \left( \frac{2\{Ro - Ro\cos\theta i + \sqrt{Zn^2 - Ro^2\sin^2\theta i}\}}{C \cdot \Delta t_R} + 0.5 \right)_{Gauss\ symbol} + 1 \quad (15a)$$

The combination of (i, J) address on the equidistant line shown by the arc with the distance Zn in FIG. 18 determined by the above method may be calculated in advance (Zn is the variable taking the value to $Z_{Zn=Ro-Ri}^{max}$), and the result may be written to be stored into the equidistant line table 15B in FIG. 16 as the address table for the equidistant address with the distance Zn.

Figure 24:
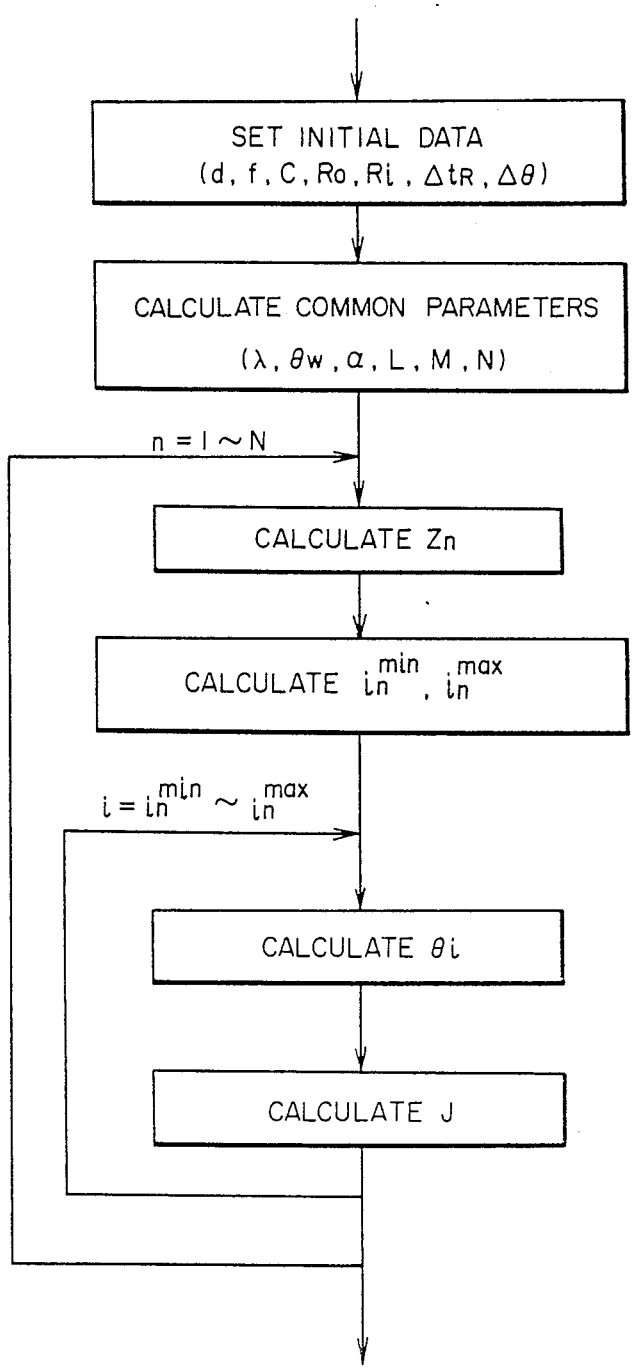
FIG. 24 is a calculation flow chart for obtaining the equidistant line table.

The manner of obtaining the combination of the (i, J) address determined by a method such as above is shown by the concrete processing flow chart in FIG. 24. The combination of the (i, J) address may be calculated in advance according to the processing flow in FIG. 24, and the result may be written to be stored as the necessary table into the table 15B in FIG. 16. The distance Zn is determined by the value corresponding to the sampling number up to the distance $Z_{Zn=Ro-Ri}^{max}$, and may be written to be stored into the table 15B as the address table as described above.

In other words, the arc-shaped equidistant line is drawn with one point as the common center as shown in FIG. 18, and the address (i, J) on each equidistant line is calculated in advance as described above as the address table to be stored into the table 15B. The direction for sequentially line-shifting the content of the memory 14B is the row direction, i.e., the direction from the upper to the lower in FIG. 18, and the data in the memory 14B is line-shifted one by one row.

In FIG. 17, when the ultrasonic transceiver element 1 in FIG. 16 is scanned, for example, clockwise on the outer wall TO of the conduit by one synthetic aperture length L shown in the drawing and uniformly distributing the received signal train obtained at one scanning point of the end point of the synthetic aperture length L, the data for a line image of the line segment l before correction is obtained in the M-th row, the scanning point of the element 1 is shifted, for example, clockwisely by every one scanning pitch from the end point, the line segment l to be imaged is also shifted clockwisely by every one scanning pitch from the position as shown by every transmission and reception of the ultrasonic wave by every movement of the scanning point, and the data for the line image before correction is similarly obtained for the line segment l to be imaged.

Then, the data for the line image before correction corresponding to the line segment l to be imaged sequentially obtained by the line-shifting operation form the image memory 14B in FIG. 16, and particularly, the correction value table 16B for correction by the ultrasonic wave propagating characteristic, mainly by the distance, will be described with reference to Fig. 19. FIG. 19 shows the manner in which the ultrasonic wave beam 2 having the space spread is transmitted from the transceiver element 1 and the reflected wave from the point in the object 6 to be inspected is received by the element 1. In FIG. 19, each distance to the scanning line (plane) of the points 61 and 62 is $Zn_1$ and $Zn_2$, their respective reflection characteristics being the same, with ultrasonic wave incident angle dependence not being present, and the ultrasonic wave reflection is being isotropically conducted. When the ultrasonic wave beam transmitted from the ultrasonic transceiver element is propagated on a spherical surface, the sound pressure $P_Z$ at the distance Z (not shown, but it is the depth of the point on the line segment l to be imaged in FIG. 17) from the scanning line (plane) is given by the following equation (16a) in cases where the reference sound pressure (sound pressure at the distance Zs (not shown)) is represented by Ps.

$$Pz=(Zs/Z) Ps \qquad (16a)$$

If the ultrasonic wave beam 2 is focused in a direction perpendicular to paper surface in the drawing, i.e., in a direction perpendicular to the scanning direction along the scanning line 5, the sound pressure Pz at the distance Z is similarly represented by the following equation (17a):

$$Pz = \left(\frac{Zs}{Z}\right)^{\frac{1}{2}} Ps \qquad (17a)$$

Since the above sound pressure is incident at the point (not shown) at the distance Z, and it is isotropically reflected and received by the transceiver element 1, it is propagated along the spherical surface from the point at the distance Z to the transceiver element 1, the received sound pressure $Pz-z$ at the transceiver element 1 is eventually represented by the following equation (18a) with respect to the incident sound pressure at the point at the distance Z given by the equation (16a):

$$Pz-z=(1/Z)(Zs/Z)Ps \qquad (18a)$$

And also, it is represented by the following equation (19a) with respect to the equation (17a):

$$Pz-=(1/Z)(Zs/Z)^{\frac{1}{2}}Ps \qquad (19a)$$

The incident sound pressure P to the point is fundamentally given by the following equation (20a): where the exponent a of the following equation is unitarily determined in the space spreading shape of the ultrasonic wave beam 2 from the transceiver element 1.

$$Pz=(Zs/Z)^a Ps \qquad (20a)$$

Therefore, the sound pressure $Pz-z$ of the ultrasonic wave reflected from the point in the object 6 received by the transceiver 1 at the distance Z is given by the following equation (21a):

$$Pz-z = \frac{(Zs)^a}{(Z)^{a+1}} Ps \qquad (21a)$$

Since the reflected signal from the point in the object 6 at the scanning point within the spreading range of the ultrasonic wave beam is accumulated in case of image reproducing based on the synthetic aperture method according to the present invention, the amount of accumulated data increases proportionally to the distance Z. Consequently, as a result of the image reproducing by the received sound pressure according to the equation (21a), Fz is the output of the image memory 14B for the data for the line image at the distance Z in FIG. 16 as the reproduced result, and it is represented by the following equation (22a):

$$Fz=(Zs/Z)^a Ps \qquad (22a)$$

And it is understood that the depending term of z still exists. This means that the data for the line image as the output of the memory 14B in FIG. 16 has the reproducing intensity depending upon the distance Z of the point even though the point has the same reflecting intensity in the object. In FIG. 19, when the points 61 and 62 are reproduced, the point 61 is intensified by $(Zn_2/Zn_1)^a$ as compared with the point 62. In other words, the reproduced image is corrected by erasing the z depending term in the equation (22a), and it is resultantly understood that the correcting value Cz determined by the following equation (23a) is multiplied by the data for the line image at the distance Z.

$$Cz=Z^a \qquad (23a)$$

As to the data for the line image obtained from the memory 14B in FIG. 16, if the address of the column direction is K, the distance $Z_k$ of the picture element of the K address is represented by the following equation (24a):

$$Z_k=(\tfrac{1}{2}) (K-1)\cdot C\cdot \Delta tR \qquad (24a)$$

And therefore, it is desirable to calculate in advance the value of $Cz_k$ or the combination of $(K, Cz_k)$ for the value of K with the equations (23a) and (24a) and to write to be stored the result into the table 16B in FIG. 16. In the above description, the sound pressure directivity of the ultrasonic wave beam and the incident angle dependence of the reflecting intensity at the point are not considered for the correction value $Cz_k$. However, if these physical values are known, it is apparent that $Cz_k$ may be calculated to include them.

Next, the operation of the above embodiment will be described. The ultrasonic transceiver element 1 is moved to the next most recent scanning point on the object 6 to be inspected. The ultrasonic wave from the element 1 is transmitted into the object 6 at the most recent scanning point, and its echo is received by the element 1. This received signal is sequentially A/D converted by the A/D converter 9B into a discrete digital value. The received data converted to the discrete digital value is sequentially stored into the memory 13B to become one line of the received signal train. The controller 17B reads out the (i, J) address value from the table 15B for cumulatively storing the received signal train so that all the values of the received signal train are uniformly distributed into the predetermined addresses of the memory 14B according to the address information of the table 15B, and uniformly distributes the received signal train from the memory 13B according to the distance lines in Fig. 18.

Here, tentatively assume that the distance Zn is a fixed value, the address of the equidistant line Zn of the memory 14B corresponding to the distance Zn is $(i_n, J_n)$, and the signal value in the received signal train in the memory 13B corresponding to the distance Zn is Sn. Then, the signal value Sn in the memory 13B is designated by T address n from the controller 17B, the value Sn is added to all the values stored in the address $(i_n, J_n)$ of the memory 14B, and the added result is stored into the original address $(i_n, J_n)$ of the memory 14B.

Thus, the received signal train in the memory 13B is uniformly distributed into the memory 14B, and the data in the memory 14B is updated. The updated data stored in the addresses (M, 1), (M, 2) . . . of the row address M in the memory 14B are sequentially taken out to the multiplier 18B by the line-shifting of the memory 14B by the controller 17B. The data taken out is from the address (M, 1) to the row address M at the intersection of the equidistant line at the distance Zz=Ro−Ri and the row M in FIG. 18. When the data by one line image is completely taken out, the content of the memory 14B is line-shifted by one row. In other words, the data in the row address m (m=1, 2, . . . , M−1) before the line-shifting is shifted to the row address (m+1) after the line-shifting, and the data stored in the row address M−1, for example, is shifted to the storing position or the row address M without altering the column address (1 to N).

On the other hand, the data for the line image in the above mentioned one line image sequentially sent from the memory 14B to the multiplier 18B is respectively multiplied by the correction value $Cz_k$ sequentially read out from the table 16B synchronously with the generation of the K address by the controller 17B. The data multiplied by the multiplier 18B is sent to the display unit 19B to display one line image of the line segment l to be imaged as the central line of the synthetic aperture range with the latest scanning point as the end point.

On the other hand, the element 1 is moved sequentially by every one scanning pitch on the object 6 to be inspected. The above mentioned operation is repeated at every movement to display the two-dimensional image of the section of the object 6 in the display unit 19B.

Figure 22:
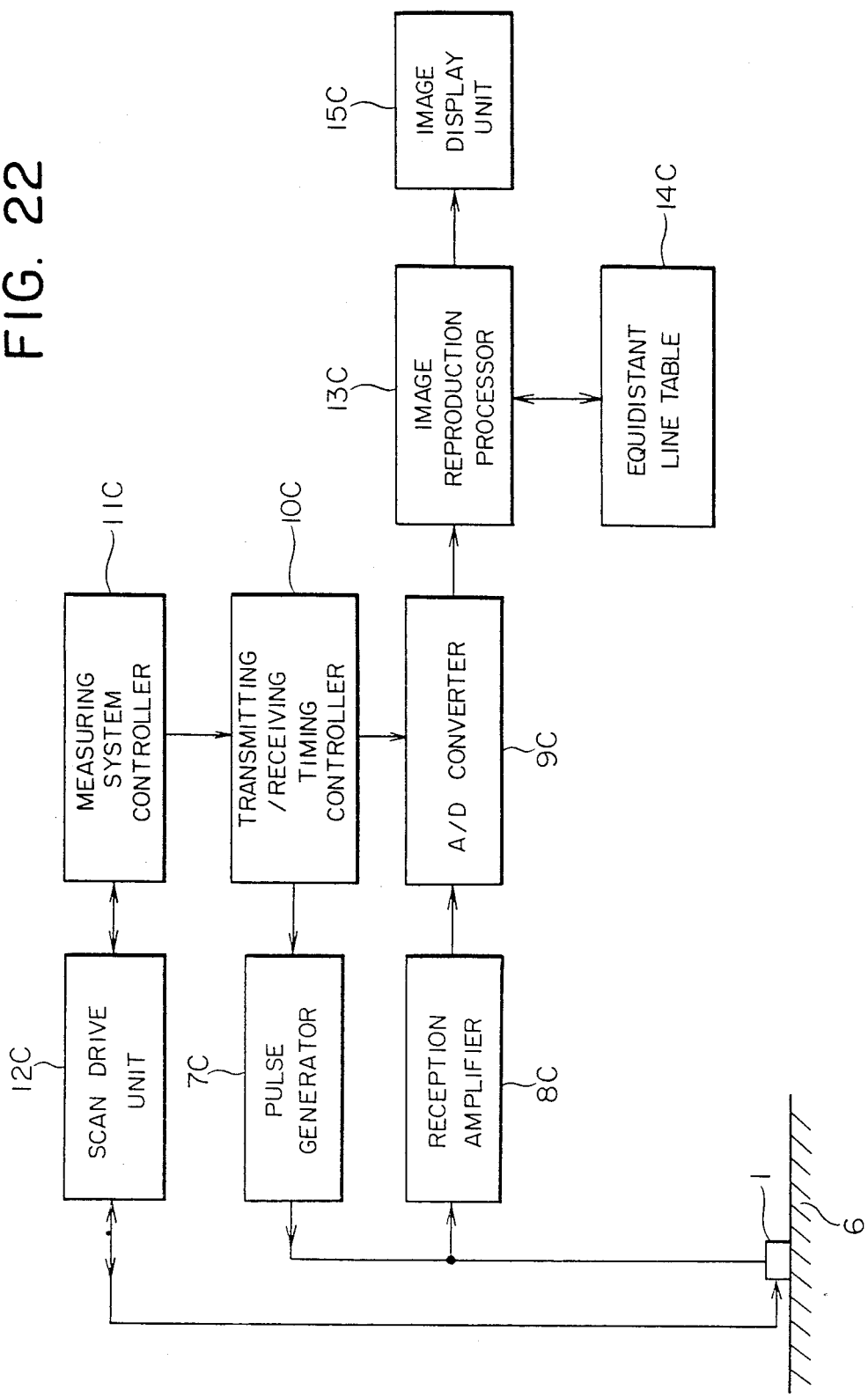
FIG. 22 is a functional block view of an apparatus applying the method of the invention.

FIG. 22 is a functional block diagram for describing the operation of the apparatus applying the present method. In FIG. 22, reference numeral 1 denotes an ultrasonic wave transceiver element, and numeral 6 denotes an object or substance to be inspected, and its internal defect is imaged by the transceiver element 1. Numeral 7C denotes a pulse generator for applying spike-shaped pulse voltage to the element 1 to transmit a predetermined ultrasonic wave signal from the element 1 into the object 6. Numeral 8C denotes a reception amplifier for amplifying the received signal obtained by the element 1. Numeral 9C denotes an A/D converter for A/D converting the received signal amplified to a predetermined level by the amplifier 8C to digitize a predetermined continuous signal for producing the discrete signal with a predetermined sampling time. Numeral 10C denotes a transmitting/receiving timing controller to generate a timing signal for applying the pulse voltage to the element 1 from the generator 7C and to generate a timing signal for controlling the starting time for the A/D converter 9C to A/D convert the received signal amplified by the amplifier 8C. Numeral 11C denotes a measuring system controller for providing a control signal for generating the timing signal to the controller 10C, and for generating the control signal for scanning the element 1 on the surface of the object 6, and further for controlling the timing for taking the position information at the time when the element 1 transmits and receives the ultrasonic wave signal through an encoder of a scan drive unit of the element 1. Numeral 12C denotes a scan drive unit for scanning the element 1 by the scan control signal from the controller 11C. Numeral 13C denotes an image reproduction processor consisting of a waveform memory for sequentially storing the discrete digital value obtained by the A/D converter 9C for every measurement at the scanning point and sequentially imaging and reproducing the image while referring to a equidistant line table 14C. Numeral 14C denotes an equidistant line table having the address table configuration for cumulatively storing into predetermined address according to the equidistant line represented by the circular arc determined by the time required from the transmission to the reception of the received discrete signal train by the A/D converter 9C to the image memory to be described later, and 15C denotes an image display unit for displaying the necessary plane image in the manner that the image area is continuously updated by means of sequentially line-shifting to display the reproduced line image.

Figure 23:
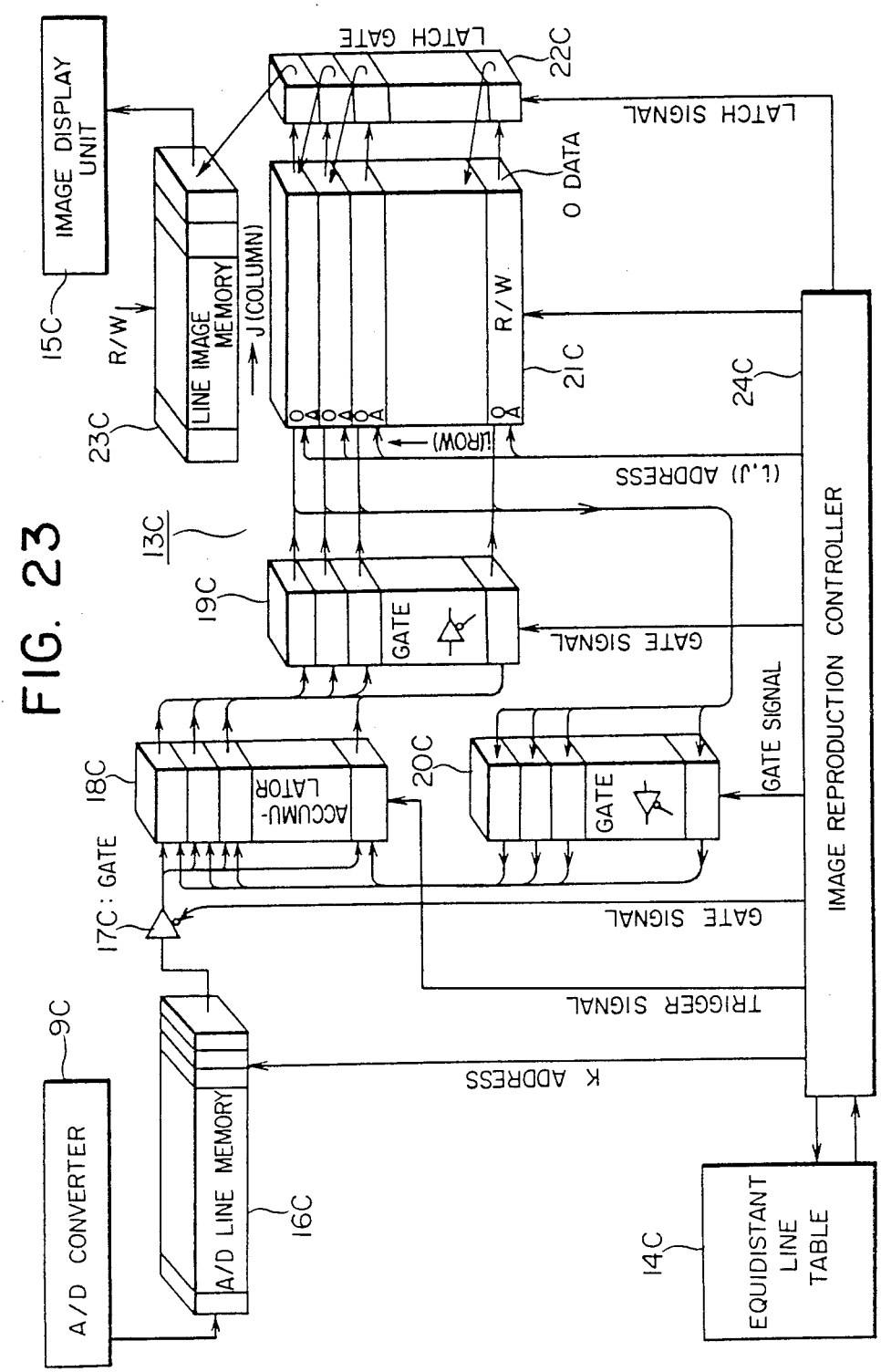
FIG. 23 is a detailed block diagram of an image reproduction processor in the apparatus above.

FIG. 23 is a detailed block diagram of the image reproduction processor 13C. In FIG. 23, numeral 16C denotes an A/D line memory for sequentially storing the discrete digital value obtained by the A/D converter 9C for temporarily storing the data received at each scanning point in cooperation with the A/D converter 9C. Numeral 17C denotes a gate interposed to sequentially input the data stored in the memory 16C to an accumulator 18C to hold the data while the necessary accumulation is performed. Numeral 18C denotes an accumulator for accumulating the received data input through the gate 17C and the image data on the address of the memory 21C designated by the equidistant table 14C, and this accumulating operation is performed according to the trigger signal being input after the time when the gate 20C is opened. Numeral 19C denotes a gate for holding data when the output of the accumulator 18C is written into the memory 21C, and numeral 20C denotes a gate for holding data on the address of the memory 21C designated by the table 14C. Numeral 21C denotes an image memory for storing the accumulated result by which the image date at the address designated by the table 14C is read out; this image data and the received data are accumulated by the accumulator 18C and the result is written again at the original address through the gate 19C. After this operation is performed for all the received data, one line is shifted through a latch gate 22C, and the data of the line (in the uppermost line (i=M) in the drawing) finished for calculating to reproduce the image is input to a line image memory 23C, and data "0" is set into the lowermost line (i=1). Numeral 22C denotes a latch gate for inputting the data of the line (i=M) finished for the uniform distribution of the data of the synthetic aperture length into the memory 23C concurrently with the line-shifting of the memory 21C so as to latch the (i−1)-th row data in the drawing, to transfer the data to i-th row by opening the gate, to repeat said operation by the times of the number of columns to thereby simultaneously shift the data by one line, to transfer the data to the memory 23C and to set the data "0" into the lowermost line in the drawing. Numeral 23C denotes a line image memory for storing the reproduced image of the line (i=M) finished the uniform distribution of the synthetic aperture length in the memory 21C as the line image sequentially output through the latch gate 22C. Numeral 24C denotes an image reproduction controller for controlling the reproduction of the image by which the data in the memory 21C is read out according to the address information stored in advance in the equidistant line table 14C, the timing of the gate 20C is controlled, the received data read out of the memory 16C is accumulated by the accumulator 18C, and the result is stored into the same address of the memory 21C through the gate 19C. After this processing is performed for the received data, the latch gate 22C is controlled to shift the data in the image memory 21C by one line and to control the timing for inputting the reproduced image to the memory 23C.

In FIG. 23, the accumulator 18C, the gates 19C, 20C, and the latch gate 22C are aligned in parallel, and their number is equalized to the number of rows i of the memory 21C, and it is apparent that this number is equal to the number M of scanning points in the range of the synthetic aperture length.

FIG. 24 concretely shows the processing flow for obtaining the combination of i and J address. The combination of the (i, J) may be calculated in advance according to the processing flow shown in FIG. 24, and the result may be written as the address into the equidistant line table 14C in FIG. 23.

The operation for performing the image reproducing process by means of referring to the equidistant line table 14C will be described with reference to FIGS. 23 and 25. The (i, j) address obtained in advance by the predetermined calculation described above is stored into the equidistant line table 14C shown in FIG. 23. FIG. 25 is a timing chart of the apparatus in FIG. 23. Assume that the scanning number of the ultrasonic transceiver element in the range of the synthetic aperture length is L. Then, the line image obtained is meaningless until exceeding M. FIG. 25 shows the case that the scanning number exceeds L to perform n times of transmission and reception. The n-th transmission and reception of the ultrasonic wave is performed, the received signal is converted to a digital value by the converter 9C, and stored into the memory 16C. The data stored in the memory 16C is that data sampled with the constant sampling time by a predetermined time delay from the start of transmittal, and this data is sequentially input through the gate 17C to the accumulator 18C. Assume that the k-th A/D converted data is input to the accumulator 18C. The address (i, J) of the table 14C corresponding to k-th data is sent to the memory 21C, the image data accessed by this address is input through the gate 20C to the accumulator 18C, and the necessary accumulation is performed. The accumulated result is written into the same address of the memory 21C through the gate 19C. This operation is performed for all the received data stored in the memory 16C to complete the image reproduction. Then, the data in each row i of the memory 21C is shifted by one line through the gate 22C, the data on the uppermost line in FIG. 23 is input to the memory 23C, and the data on the lowermost line becomes "0". When this operation is finished, the process for the n-th transmission and reception is entirely completed, the (n+1)-th transmission and reception is then carried out, and image reproduction in an infinite area may be realized by means of repeating this operation.

According to the invention as described above, the method of imaging an object based on a synthetic aperture method having excellent azimuth resolution emits an ultrasonic or electromagnetic wave beam to the object to be imaged; receives the reflected wave from the object; stores the received signal group in one synthetic aperture range into the waveform memory; accumulates the data for every data group for means of th data group in the waveform memory corresponding to the TOF locus line to produce the data for the line image at the central line in the synthetic aperture range; corrects the data for the line image by the image correcting value determined by the distance directly below the scanning line (plane); sequentially displays the corrected data of the line image; and images while scanning the ultrasonic or electromagnetic wave transmitting and receiving system in the space to be imaged. Therefore, necessary memory capacity can be cut down, limited memory area can be effectively utilized, imaging time can be accelerated (processed in real time), and imaging with high quality can be realized without depending upon the distance.

According to another aspect of the invention as described above, the method of imaging an object applying the image reproducing system based a the synthetic aperture method having excellent azimuth resolution uniformly distributes the received signal train obtained at one scanning point by the transmission and reception of the ultrasonic or electromagnetic wave to the object to be inspected in only one synthetic aperture range by means of the equidistant line information in the equidistant line table, accumulates the data in the image memory, line-shifts the image memory by one row after the uniform distribution to provide the data of one line image by the data of one row from the image memory produced by the line-shifting, displays the line image by means of the data of one line image corrected by the image correcting value determined by the distance directly below the scanning line (plane) of the transmission and reception system; and obtains the two-dimensional image by repeating the operation at each scanning point. And therefore, necessary memory capacity can be cut down, limited memory area can be effectively utilized, imaging time can be accelerated (processed in real time), and a concrete and fundamental method may be provided for realizing an ultrasonic imaging apparatus which can perform high quality imaging without depending upon the distance.

What is claimed is:

1. In a method of imaging an object wherein when a target object is imaged using ultrasonic or electromagnetic waves based on a synthetic aperture method to obtain an image of said target object by mechanically or electronically scanning an ultrasonic or electromagnetic wave transcieving system to transmit ultrasonic or electromagnetic waves which spread spacially in relation to said object, and to receive waves reflected from said target object, while obtaining an image of said target object by using a Time of Flight locus line along a direction of scanning prescribed by a phase delay in a received signal generated in a period from the transmission of waves to the reception of waves, wherein a method of imaging an object by ultrasonic or electromagnetic waves further comprises the steps of using a receive signal group from each of a plurality of scanning points within a range of a synthetic aperture to sequentially reproduce a line image of a central line of said synthetic aperture range, whereby an image of a target spatial area is sequentially produced while said ultrasonic or electromagnetic wave transceiver system is being scanned.

2. The method as set forth in claim 1, further characterized in that when a discrete digital value obtained by A/D converting a received signal train at each of a plurality of scan points in response to the latest scan point in a certain synthetic aperture range is store into a wave form memory comprised of a two-dimensional frame memory, currently stored groups, of received signal trains up to the scan point directly preceding said latest scan point are all line shifted by only one scan point portion, the received signal train corresponding to said latest scan point is stored in the area in which the received signal train corresponding to the directly preceding scan point was stored, and sequentially repeating an operation to reproduce a line image of a central line of the synthetic aperture range every time an ultrasonic or electromagnetic wave is transmitted or received to image a spatial area to be imaged while scanning the ultrasonic or electromagnetic wave transceiving system.

3. The method as set forth in claim 2, further comprising the steps of tabling the row and column address group in the waveform memory determined by the TOF locus of each received signal at each of a plurality of scanning points in the synthetic aperture range corresponding to each point on the central line when imaging the line image at the central line of the synthetic aperture range, and commonly referring to the tabled address with respect to all the scanning points to reproduce sequentially the line image.

4. The method as set forth in claim 2, further comprising the steps of tabling the row and column address group in the waveform memory determined by each TOF locus of the received signal at each of a plurality of scanning points in the synthetic aperture range corresponding to each point on the central line with the column address difference at the row corresponding to each scanning point as a delay amount when imaging the line image at the central line in the synthetic aperture range, tabling the delay amount group, sequentially delaying and adding the received signal train at all the rows by referring to the delay amount table, and reproducing sequentially the line image.

5. The method as set forth in claim 1, further comprising the steps of multiplying the image correcting value determined by the distance directly below the scanning line or plane of the ultrasonic or electromagnetic wave transmitting and receiving system by the data for the line image to correct the data, displaying sequentially the data for the line image corrected at the central line in the synthetic aperture range, and imaging the spatial area to be imaged of the object while scanning the ultrasonic or electromagnetic wave transmitting/receiving system.

6. The method as set forth in claim 2, further comprising the steps of multiplying the image correcting value determined by the distance directly below the scanning line or plane of the ultrasonic or electromagnetic wave transmitting and receiving system by the data for the line image to correct the data, displaying sequentially the data for the line image corrected at the central line of the synthetic aperture range, and imaging the spatial area to be imaged of the object while scanning the ultrasonic or electromagnetic wave transmitting/receiving system.

7. The method as set forth in claim 5, further comprising the steps of tabling by calculating in advance the image correction value determined by the distance directly below the point to be imaged on the central line of the synthetic aperture range from the scanning line or plane, storing it into a line memory of one-dimensional configuration, reading each image correction value from the line memory in response to each point to be imaged, and multiplying the same.

8. The method as set forth in claim 3, consisting of A/D converting means for producing a digital value by digitizing the received signal to a discrete signal with a predetermined sampling time, A/D memory means for storing the discrete digital value from said A/D converting means by one line for each scanning point, waveform memory means for storing sequentially the digital value train stored in said A/D memory means, latch gate means formed to line-shift sequentially the digital value group stored in said waveform memory means by one scanning line, TOF locus line table means for storing the corresponding address information in the waveform memory by the TOF locus line calculated in advance, adding means for adding the digital value simultaneously by means of reading out the digital value in the waveform memory corresponding to one TOF locus line of said TOF locus line table means according to the address information obtained from the TOF locus line table means, image memory means for storing the data of the line image corresponding to the central line in the synthetic aperture range by storing sequentially the data of one picture element obtained by said adding means, and image display means for displaying the line image transferred from said image memory means while digital/analog converting the data while sequentially scrolling the data.

9. A method of imaging an object by an ultrasonic or electromagnetic wave transmitting the ultrasonic or electromagnetic wave beam with a spatial spreading for the object being accomplished by mechanically or electronically scanning an ultrasonic or electromagnetic wave transmitting/receiving system in when imaging the object by an ultrasonic or electromagnetic wave based on a synthetic aperture method, sequentially distributing uniformly the intensity of a received reflected signal defined within the spreading of the ultrasonic or electromagnetic wave beam on a circular arc having the scanning point position as the center of said circular arc, and the distance to the object defined by the time required from the transmission to the reception, and a sonic velocity or light velocity as the radius of said circular arc when receiving a reflected wave from the object, and sequentially adding the discrete value at the same position in the defined range to image the object, comprising the steps of:

sequentially reproducing the line image at a central line of the synthetic aperture range while sequentially dispersing the received signal train from each of a plurality of scanning points in the synthetic aperture range, and sequentially imaging the spatial area to be imaged by scanning the ultrasonic or electromagnetic transmitting/receiving system.

10. The method as set forth in claim 9, further comprising the steps of dispersing the discrete digital value train obtained by analog/digital converting the received signal train at each of a plurality of scanning points, line-shifting all the currently stored data in the image memory to the scanning point immediately before the latest scanning point by one scanning point in case of storing the accumulated digital value into the image memory formed to be a two-dimensional frame memory in response to the latest scanning point in an arbitrary one synthetic aperture range at the time when the desired reproduced image value is obtained by the accumulation, and sequentially repeating the reproducing operation of the line image at the central line of the arbitrary synthetic aperture range at every transmitting and receiving time of the ultrasonic or electromagnetic wave beam while scanning the ultrasonic or electromagnetic wave transmitting/receiving system by means of dispersing, accumulating and storing the received signal train corresponding to the latest scanning point.

11. The method as set forth in claim 9, further comprising the steps of tabling the row and column address group in the image memory on the circular arc corresponding to the received signal train at a predetermined one scanning point, and commonly referring to the table address for all the scanning points.

12. The method as set forth in claim 9, further comprising the steps of multiplying the image correcting value determined by the distance directly below the scanning line or plane of the ultrasonic or electromagnetic wave transmitting and receiving system by the data for the line image to correct said data, displaying sequentially the corrected data for the line image as the line image at the central line of the synthetic aperture range, displaying sequentially the corrected data for the line image sequentially obtained at every scanning point to image the spatial area to be imaged of the object while scanning the ultrasonic or electromagnetic wave transmitting/receiving system.

13. The method as set forth in claim 10, further comprising the steps of multiplying the image correcting value determined by the distance directly below the scanning line or plane of the ultrasonic or electromagnetic wave transmitting and receiving system by the data for the line image to correct said data, displaying sequentially the corrected data for the line image as the line image at the central line of the synthetic aperture range, displaying sequentially the corrected data for the line image sequentially obtained at every scanning point to image the spatial area to be imaged of the object while scanning the ultrasonic or electromagnetic wave transmitting/receiving system.

14. The method as set forth in claim 12, further comprising the steps of tabling in advance the image correcting value determined by the distance directly below the point to be imaged on the central line of the synthetic aperture range to store the value into a one-dimensional line memory, and multiplying each correcting value by means of reading out each correcting value to be imaged from the line memory in response to the point to be imaged.

15. The method as set forth in claim 10, consisting of an A/D converter for obtaining digital value by digitizing the received signal to discrete signal with a predetermined sampling time, an A/D line memory for storing said obtained discrete digital value by one unit, an image memory for reading out the image data at the reproducing step in case of calculating to reproduce the image, an equidistant line table for tabling the equidistant line distribution from the scanning point position, an accumulator for adding the image data at the address designated by the equidistant line table and the received data, a gate for writing the accumulated result into the image memory, a latch gate for shifting the image data by one line in the image memory after completing the accumulation, a line image memory for outputting the line completed the image reproduction, and an image display unit for receiving sequentially the line image to display the image by scrolling.

* * * * *